US011349651B2

(12) United States Patent
Fu et al.

(10) Patent No.: US 11,349,651 B2
(45) Date of Patent: May 31, 2022

(54) MEASUREMENT PROCESSING OF HIGH-SPEED CRYPTOGRAPHIC OPERATION

(71) Applicant: Alibaba Group Holding Limited, Grand Cayman (KY)

(72) Inventors: Yingfang Fu, Hangzhou (CN); Peng Xiao, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/529,524

(22) Filed: Aug. 1, 2019

(65) Prior Publication Data
US 2020/0044841 A1 Feb. 6, 2020

(30) Foreign Application Priority Data

Aug. 2, 2018 (CN) .......................... 201810872799.1

(51) Int. Cl.
*H04L 9/08* (2006.01)
*H04L 9/32* (2006.01)
*H04L 9/30* (2006.01)

(52) U.S. Cl.
CPC .............. *H04L 9/0877* (2013.01); *H04L 9/30* (2013.01); *H04L 9/3234* (2013.01); *H04L 2209/122* (2013.01); *H04L 2209/127* (2013.01)

(58) Field of Classification Search
CPC ....... H04L 9/0877; H04L 9/3234; H04L 9/30; H04L 2209/122; H04L 2209/127;
(Continued)

(56) References Cited

U.S. PATENT DOCUMENTS 7,967,193 B1 * 6/2011 McGinley ............... G07F 19/20
235/379
8,442,960 B1 5/2013 Meyer et al.
(Continued)

FOREIGN PATENT DOCUMENTS

CN 1553349 12/2004
CN 201051744 Y 4/2008
(Continued)

OTHER PUBLICATIONS

Haung et al., "The TPCM 3P3C Defense Architecture of Safety and Trusted Platform," retrieved on Jun. 28, 2019 at http://www.wuj.whu.edu.cn/d/file/allhtml/lx/lx1802/337159b2-52a0-4cb0-a373-26f5bebd3834.htm, vol. 64 No. 2, Apr. 2019 (6 pages).
(Continued)

*Primary Examiner* — Quazi Farooqui
(74) *Attorney, Agent, or Firm* — Lee & Hayes, P.C.

(57) ABSTRACT

A method including a security chip receiving a cryptographic operation request; the security chip acquiring a measurement result, wherein the measurement result is a result of measuring a dynamic measurement module in a cryptographic operation module by using a platform measurement root; and the security chip starting a cryptographic operation when determining that the measurement result is identical to a pre-stored standard value. The present disclosure solves a technical problem of failure to guarantee a dynamic trust for measurement code when starting dynamic measurement of a cryptographic operation.

19 Claims, 10 Drawing Sheets

(58) Field of Classification Search
CPC ..... H04L 2209/38; H04L 9/3239; H04L 9/08;
H04L 9/32; G06F 21/602; G06F 21/72
See application file for complete search history.

(56) References Cited

U.S. PATENT DOCUMENTS

| | | | |
|---|---|---|---|
| 8,645,711 B2 | 2/2014 | Ohhashi | |
| 8,767,957 B1 * | 7/2014 | Bagchi | G09C 1/00 380/29 |
| 8,931,082 B2 | 1/2015 | Rodgers et al. | |
| 9,081,954 B2 | 7/2015 | Forristal | |
| 9,246,690 B1 | 1/2016 | Roth et al. | |
| 9,294,282 B1 | 3/2016 | Potlapally et al. | |
| 9,530,002 B1 | 12/2016 | Hamlin | |
| 9,893,882 B1 | 2/2018 | Thadishetty | |
| 10,211,977 B1 | 2/2019 | Roth et al. | |
| 10,891,366 B1 | 1/2021 | Wu et al. | |
| 11,026,628 B1 | 6/2021 | Bruinsma et al. | |
| 2003/0097581 A1 | 5/2003 | Zimmer | |
| 2003/0188146 A1 | 10/2003 | Hale et al. | |
| 2004/0158828 A1 | 8/2004 | Zimmer et al. | |
| 2004/0190721 A1 | 9/2004 | Barrett et al. | |
| 2005/0108564 A1 | 5/2005 | Freeman et al. | |
| 2005/0166024 A1 | 7/2005 | Angelo et al. | |
| 2005/0251857 A1 | 11/2005 | Schunter et al. | |
| 2005/0262571 A1 | 11/2005 | Zimmer et al. | |
| 2005/0289646 A1 | 12/2005 | Zimmer et al. | |
| 2006/0010326 A1 | 1/2006 | Bade et al. | |
| 2006/0059369 A1 | 3/2006 | Fayad et al. | |
| 2006/0075223 A1 | 4/2006 | Bade et al. | |
| 2006/0155988 A1 | 7/2006 | Hunter et al. | |
| 2006/0289659 A1 | 12/2006 | Mizushima | |
| 2007/0094711 A1 | 4/2007 | Corley et al. | |
| 2007/0143543 A1 | 6/2007 | Lin et al. | |
| 2007/0154018 A1 | 7/2007 | Watanabe | |
| 2007/0294178 A1 | 12/2007 | Pinder et al. | |
| 2008/0005586 A1 | 1/2008 | Munguia | |
| 2008/0046581 A1 | 2/2008 | Molina et al. | |
| 2008/0072071 A1 | 3/2008 | Forehand et al. | |
| 2008/0077993 A1 | 3/2008 | Zimmer et al. | |
| 2008/0126779 A1 | 5/2008 | Smith | |
| 2008/0192937 A1 | 8/2008 | Challener | |
| 2008/0223925 A1 | 9/2008 | Saito et al. | |
| 2008/0244746 A1 | 10/2008 | Rozas et al. | |
| 2008/0270781 A1 | 10/2008 | Ibrahim et al. | |
| 2009/0043708 A9 | 2/2009 | Silverbook et al. | |
| 2009/0067689 A1 | 3/2009 | Porter et al. | |
| 2009/0070593 A1 | 3/2009 | Boshra et al. | |
| 2009/0144046 A1 | 6/2009 | Rothman et al. | |
| 2009/0172378 A1 | 7/2009 | Kazmierczak et al. | |
| 2010/0011219 A1 | 1/2010 | Burton et al. | |
| 2010/0023747 A1 | 1/2010 | Asnaashari et al. | |
| 2010/0082960 A1 | 4/2010 | Grobman et al. | |
| 2010/0088499 A1 | 4/2010 | Zimmer et al. | |
| 2010/0174652 A1 | 7/2010 | Shear et al. | |
| 2010/0281273 A1 | 11/2010 | Lee et al. | |
| 2011/0013773 A1 | 1/2011 | Pinder | |
| 2011/0211690 A1 | 9/2011 | Tu et al. | |
| 2011/0302638 A1 | 12/2011 | Cha et al. | |
| 2012/0151223 A1 | 6/2012 | Conde Marques et al. | |
| 2012/0185683 A1 | 7/2012 | Krstic et al. | |
| 2012/0201379 A1 | 8/2012 | Fuchs et al. | |
| 2012/0266252 A1 | 10/2012 | Spiers et al. | |
| 2012/0331285 A1 | 12/2012 | Bangerter et al. | |
| 2013/0016832 A1 | 1/2013 | Yamashita | |
| 2013/0104188 A1 | 4/2013 | Western et al. | |
| 2013/0125204 A1 | 5/2013 | La Fever et al. | |
| 2013/0318343 A1 | 11/2013 | Bjarnason et al. | |
| 2014/0068766 A1 | 3/2014 | Klustaitis et al. | |
| 2014/0122897 A1 | 5/2014 | Dodeja et al. | |
| 2014/0140512 A1 | 5/2014 | Hadley | |
| 2014/0250291 A1 | 9/2014 | Adams et al. | |
| 2014/0256419 A1 | 9/2014 | Laputz et al. | |
| 2014/0258733 A1 | 9/2014 | Scott-Nash | |
| 2014/0298040 A1 | 10/2014 | Ignatchenko et al. | |
| 2014/0359268 A1 | 12/2014 | Jauhiainen et al. | |
| 2015/0012737 A1 | 1/2015 | Newell | |
| 2015/0074387 A1 | 3/2015 | Lewis | |
| 2015/0074392 A1 | 3/2015 | Boivie et al. | |
| 2015/0100299 A1 | 4/2015 | Abraham et al. | |
| 2015/0200934 A1 | 7/2015 | Naguib | |
| 2016/0026810 A1 | 1/2016 | Hagiwara et al. | |
| 2016/0065375 A1 | 3/2016 | Kahana et al. | |
| 2016/0070932 A1 | 3/2016 | Zimmer et al. | |
| 2016/0098283 A1 | 4/2016 | Martinez et al. | |
| 2016/0119141 A1 | 4/2016 | Jing et al. | |
| 2016/0142772 A1 | 5/2016 | Pinder et al. | |
| 2016/0306977 A1 | 10/2016 | Zarakas et al. | |
| 2017/0118018 A1 | 4/2017 | Dekker et al. | |
| 2017/0132159 A1 | 5/2017 | Joshi et al. | |
| 2017/0257365 A1 | 9/2017 | Gonzalez et al. | |
| 2017/0329685 A1 * | 11/2017 | Jenkins | G06F 11/2273 |
| 2017/0364685 A1 | 12/2017 | Shah et al. | |
| 2018/0004980 A1 | 1/2018 | Kuczynski et al. | |
| 2018/0026969 A1 | 1/2018 | Newton et al. | |
| 2018/0069693 A1 | 3/2018 | Boivie et al. | |
| 2018/0091311 A1 | 3/2018 | Kisley et al. | |
| 2018/0091314 A1 | 3/2018 | Li et al. | |
| 2018/0101689 A1 | 4/2018 | Arnold et al. | |
| 2018/0109377 A1 | 4/2018 | Fu | |
| 2018/0157839 A1 | 6/2018 | Pearson | |
| 2018/0167268 A1 | 6/2018 | Liguori et al. | |
| 2018/0174013 A1 | 6/2018 | Lee | |
| 2018/0288011 A1 | 10/2018 | Marquardt et al. | |
| 2018/0343110 A1 | 11/2018 | Funk | |
| 2018/0367317 A1 | 12/2018 | Forler et al. | |
| 2019/0036893 A1 | 1/2019 | Jiang | |
| 2019/0080099 A1 | 3/2019 | Roth et al. | |
| 2019/0095192 A1 | 3/2019 | Akita et al. | |
| 2019/0103961 A1 * | 4/2019 | Chhabra | H04L 9/0825 |
| 2019/0108332 A1 | 4/2019 | Glew et al. | |
| 2019/0124054 A1 | 4/2019 | Zhang et al. | |
| 2019/0163910 A1 | 5/2019 | Moon et al. | |
| 2019/0213359 A1 | 7/2019 | Kepa et al. | |
| 2019/0259029 A1 | 8/2019 | Chilton et al. | |
| 2019/0268155 A1 * | 8/2019 | Guo | H04W 12/126 |
| 2019/0311126 A1 | 10/2019 | Areno et al. | |
| 2019/0334713 A1 | 10/2019 | Fu et al. | |
| 2019/0384918 A1 | 12/2019 | Ndu et al. | |
| 2019/0392151 A1 | 12/2019 | Lee et al. | |
| 2020/0004967 A1 | 1/2020 | Fu et al. | |
| 2020/0026882 A1 | 1/2020 | Fu et al. | |
| 2020/0042709 A1 | 2/2020 | Fu et al. | |
| 2020/0074088 A1 | 3/2020 | Fu | |
| 2020/0074121 A1 | 3/2020 | Fu | |
| 2020/0074122 A1 | 3/2020 | Fu et al. | |
| 2020/0104528 A1 | 4/2020 | Fu | |
| 2020/0117805 A1 | 4/2020 | Li et al. | |
| 2020/0226586 A1 | 7/2020 | Lu et al. | |
| 2020/0410097 A1 | 12/2020 | Miller | |
| 2021/0056066 A1 | 2/2021 | Vijayrao | |

FOREIGN PATENT DOCUMENTS

| | | |
|---|---|---|
| CN | 101344904 | 9/2010 |
| CN | 101997834 B | 3/2011 |
| CN | 102438013 | 5/2012 |
| CN | 104778141 A | 7/2015 |
| CN | 106230584 A | 12/2016 |
| CN | 106372487 | 2/2017 |
| CN | 103856478 | 11/2017 |
| CN | 108243009 A | 7/2018 |
| CN | 110795774 | 8/2018 |
| CN | 201810871817.4 A | 8/2018 |
| CN | 109614799 A | 4/2019 |
| CN | 106027235 | 5/2019 |
| CN | 109784070 A | 5/2019 |
| CN | 108234115 | 3/2021 |
| CN | 108011716 | 4/2021 |
| JP | 2005275467 A | 10/2005 |

(56) References Cited

FOREIGN PATENT DOCUMENTS

| WO | WO2016160597 | 10/2016 |
|----|--------------|---------|
| WO | WO2019098573 A1 | 5/2019 |

OTHER PUBLICATIONS

Intel QAT powers Nginx compression processing—Linux high, retrieved on Jul. 3, 2019 at https://syswift.com/407.html, 21 pages.
The PCT Search Report and Written Opinion dated Jul. 30, 2019 for PCT Application No. PCT/US19/28989, 7 pages.
mamicode.com, "Trusted Execution Technology—Basic Principles," retrieved on Jun. 28, 2019 from http://www.mamicode.com/info-detail-2182008.html, time stamped Feb. 4, 2018 (8 pages).
GB, "Information security technology—Trusted computing specification—Motherboard Funcation adn interfae of trusted Platform", Nov. 12, 2013, 414 pages.
Office Action for U.S. Appl. No. 16/393,870, dated Apr. 5, 2021, Fu, "Encryption Card, Electronic Device, and Encryption Service Method", 10 Pages.
Office Action for U.S. Appl. No. 16/460,907, dated May 11, 2021, Fu, "Methods and Systems for Activating Measurement Based on a Trusted Card", 22 Pages.
Office Action for U.S. Appl. No. 16/529,582, dated May 26, 2021, "Measurement Methods, Devices and Systems Based on Trusted High-Speed Encryption Card", 9 Pages.
Olzak, "Chapter 8—UEFI and the TPM: Building a foundation for the platform trust", retrieved at <<https://resources.infosecinstitute.com/topic/uefi-andtpm-2>>, Jun. 2012, 18 pgs.
Office Action for U.S. Appl. No. 16/538,008, dated Jun. 8, 2021, Fu, "Key Processing Methods and Apparatuses, Storage Media, and Processors", 21 Pages.
Office Action for U.S. Appl. No. 16/554,383, dated Jun. 24, 2021, "Cryptographic Operation Processing Method, Apparatus, and System, and Method for Building Measurement for Trust Chain", 78 Pages.
Office Action for U.S. Appl. No. 16/554,241, dated Jul. 14, 2021, Fu, "Cryptographic Operation Processing Methods, Apparatuses, and Systems", 23 Pages.
Office Action for U.S. Appl. No. 16/393,870, dated Jul. 27, 2021, Fu, "Encryption Card, Electronic Device, and Encryption Service Method", 11 Pages.
Office Action for U.S. Appl. No. 16/457,650, dated Aug. 9, 2021, Fu, "Key and Certificate Distribution Method, Identity Information Processing Method, Device, and Medium", 8 Pages.
Office Action for U.S. Appl. No. 16/586,463, dated Aug. 16, 2021, Fu, "Data Processing Method, Device and System", 19 Pages.
Office Action for U.S. Appl. No. 16/460,907, dated Sep. 21, 2021, Fu, "Methods and Systems for Activating Measurement Based On a Trusted Card", 25 Pages.
Office Action for U.S. Appl. No. 16/554,383, dated Oct. 13, 2021, Fu, "Cryptographic Operation Processing Method, Apparatus, and System, and Method for Building Measurement for Trust Chain", 76 pgs.
Trusted Platform Module 2.0, Oct. 2017, Microsoft Corporation, 2017, 3 pgs.
Office Action for U.S. Appl. No. 16/554,241, dated Nov. 15, 2021, Fu, "Cryptographic Operation Processing Methods, Apparatuses, and Systems", 24 Pages.
Zhang, et al., "A New Approach of TPM Construction Based on J2810", Wuhan University Journal of Natural Sciences, vol. 12, No. 1, https://doi.org/10.1007/s11859-006-0146-6, 2007, 4 pgs.
English Translation of CN Office Action dated Jan. 6, 2022 for CN Patent Application No. 201810996079.6, 39 pages.
Extended European Search Report dated Dec. 13, 2021 for European Patent Application No. 19793424.3, 8 pages.
English Translation of CN Office Action dated Mar. 3, 2022 for CN Patent Application No. 2018111430317, 7 pages.
English Translation of CN Office Action dated Dec. 28, 2021 for CN Patent Application No. 201810707787.3, 4 pages.
Office Action for U.S. Appl. No. 16/586,463, dated Feb. 4, 2022, Fu, "Data Processing Method, Device and System", 23 Pages.

\* cited by examiner

MEASUREMENT PROCESSING OF HIGH-SPEED CRYPTOGRAPHIC OPERATION

CROSS REFERENCE TO RELATED PATENT APPLICATIONS

This application claims priority to Chinese Patent Application No. 201810872799.1, filed on 2 Aug. 2018 and entitled "METHOD, APPARATUS, STORAGE MEDIUM, AND PROCESSOR FOR MEASUREMENT PROCESSING OF HIGH-SPEED CRYPTOGRAPHIC OPERATION," which is incorporated herein by reference in its entirety.

TECHNICAL FIELD

The present disclosure relates to the field of trusted computing, and, more particularly, to methods, apparatuses, storage media, and processors for measurement processing of cryptographic operations such as high-speed cryptographic operations.

BACKGROUND

With the popularization of computer applications and increasingly rampant hardware attacks, more attention has been paid to the integrity assurance for transaction platforms and systems. Measurement is a novel technological means for protecting the integrity of platforms and systems as follows: at certain particular moments, a target is measured to obtain certain information of the target (e.g., hash values of files), the information values are compared with pre-recorded standard values, thereby determining whether the target integrity has been destroyed.

At present, there are two technical routes of trusted computing: Trusted Platform Control Module (TPCM) in China and Trusted Platform Module (TPM) organized by the international Trusted Computing Group (TCG).

In a trusted high-speed encryption card scenario, the conventional measurement methods and measurement processes of the conventional TPM and TPCM have the following defects:

a) failure to guarantee trust chain transfer when starting dynamic measurement of the high-speed cryptographic operation; and b) failure to guarantee trusted loading of a dynamic measurement code and trusted dynamic execution when starting dynamic measurement of the high-speed cryptographic operation.

At present, no efficient solution has been presented for the problem of failure to guarantee the dynamic trust for measurement code when starting dynamic measurement of a high-speed cryptographic operation.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide methods, apparatuses, storage media, and processors for measurement processing of cryptographic operations, to at least solve the technical problem of failure to guarantee dynamic trust for measurement codes when starting dynamic measurement of the cryptographic operations. For example, the cryptographic operation herein is high-speed cryptographic operations According to an example embodiment of the present disclosure, a method for measurement processing of a cryptographic operation such as high-speed cryptographic operations is provided, including: a security chip receiving a cryptographic operation request; the security chip acquiring a measurement result, wherein the measurement result is a result of measuring a dynamic measurement module in a cryptographic operation module by using a platform measurement root; and the security chip starting a cryptographic operation when the measurement result is determined to be identical to a pre-stored standard value. In the present disclosure, the term "identical" means that the measurement result is the same as the pre-stored standard value or a deviation between the measurement result and the pre-stored standard value is within a preset range. In the present disclosure, for example, the measurement root refers to root of trust for measurement.

According to an example embodiment of the present disclosure, a method for dynamic measurement of a cryptographic operation is further provided, including: a host processor receiving a platform measurement root loaded by a security chip and a dynamic measurement module configured to start a cryptographic operation; the host processor measuring the dynamic measurement module by using the platform measurement root to obtain a measurement result; and the host processor sending the measurement result to the security chip, such that the security chip determines whether to start a cryptographic operation based on a comparison result between the measurement result and a pre-stored standard value.

According to an example embodiment of the present disclosure, an apparatus for dynamic measurement of a cryptographic operation is further provided. The apparatus is applied to a security chip and includes: a first receiving module configured to receive a cryptographic operation request; an acquiring module configured to acquire a measurement result, wherein the measurement result is a result of measuring a dynamic measurement module in a cryptographic operation module by using a platform measurement root; and a starting module configured to start a cryptographic operation when the measurement result is determined to be identical to a pre-stored standard value.

According to an example embodiment of the present disclosure, an apparatus for dynamic measurement of a cryptographic operation is further provided. The apparatus is applied to a host processor and includes: a second receiving module configured to receive a platform measurement root loaded by a security chip and a dynamic measurement module configured to start a cryptographic operation; a measuring module configured to measure the dynamic measurement module by using the platform measurement root to obtain a measurement result; and a sending module configured to send the measurement result to the security chip, such that the security chip determines whether to start a cryptographic operation based on a comparison result between the measurement result and a pre-stored standard value.

According to an example embodiment of the present disclosure, a system for dynamic measurement of a cryptographic operation is further provided, including: a security chip and a host processor, wherein the security chip is configured to receive a cryptographic operation request; and load, in response to the cryptographic operation request, a platform measurement root and a dynamic measurement module configured to start a cryptographic operation in a cryptographic operation module to the host processor; the host processor is configured to measure the dynamic measurement module by using the platform measurement root to obtain a measurement result, and send the measurement result to the security chip; and the security chip is further configured to determine whether to start a cryptographic operation based on a comparison result between the measurement result and a pre-stored standard value.

According to an example embodiment of the present disclosure, a method for data processing includes: a first processor receiving a cryptographic operation request; the first processor sending a measurement root and a to-be-measured object to a second processor, wherein the second processor measures the to-be-measured object by using the measurement root; the first processor receiving a measurement result from the second processor; and the first processor determining that the measurement result meets a preset condition, and starting a cryptographic operation.

According to an example embodiment of the present disclosure, a storage medium is provided. The storage medium includes a stored program or computer-readable instructions, where the program, when executed by one or more processors or processing circuits (processors), controls a computing device to execute the above method for dynamic measurement of a cryptographic operation.

According to an example embodiment of the present disclosure, a server is provided. The server is configured to run a program or computer-readable instruction, where the program, when executed by one or more processors, cause the one or more servers to execute the above method for dynamic measurement of a cryptographic operation.

In the example embodiments of the present disclosure, a security chip receives a cryptographic operation request, then measures a dynamic measurement module in a cryptographic operation module by using a platform measurement root to obtain a measurement result, compares the measurement result with a pre-stored standard value, and then starts the cryptographic operation in the case that the measurement result is identical to the pre-stored standard value. Since the cryptographic operation request is a trigger instruction for starting a cryptographic operation, the security chip, after receiving the cryptographic operation request, firstly verifies whether the measurement result of dynamic measurement on the cryptographic operation module complies with the pre-stored standard value, and then starts a cryptographic operation after the verification is successful, thereby achieving the purpose of verifying the measurement result of dynamic measurement on the cryptographic operation module. Thus, whether the measurement result of dynamic measurement is trustable is determined by comparing the measurement result with the pre-stored standard value, thereby guaranteeing a technical effect of dynamic trust for measurement of a cryptographic operation and solving the technical problem of failure to guarantee a dynamic trust for measurement code when starting dynamic measurement of a cryptographic operation.

BRIEF DESCRIPTION OF THE DRAWINGS

The accompanying drawings described herein are used for providing further understanding of the present disclosure and constitute a part of the present disclosure. The example embodiments of the present disclosure and description thereof are used for illustrating the present disclosure, and do not constitute a limitation to the present disclosure. In the drawings.

DETAILED DESCRIPTION

Figure 1:
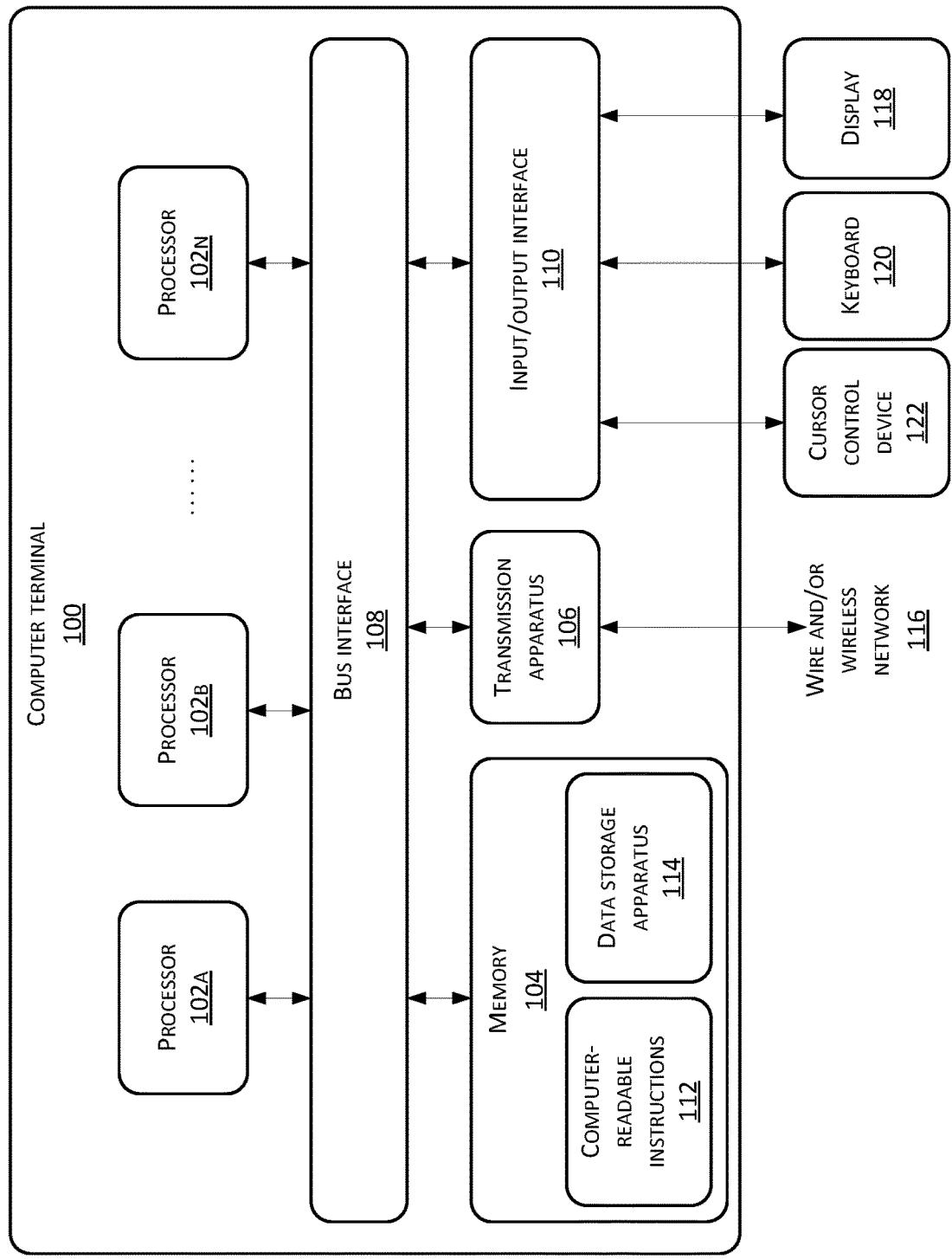
FIG. 1 shows a block diagram of hardware configuration of a computer terminal (or mobile device) for implementing a method for message interaction.

To enable those of ordinary skill in the art better understand the solutions of the present disclosure, the technical solutions in the example embodiments of the present disclosure will be clearly and completely described below in combination with the accompanying drawings in the example embodiments of the present disclosure. Apparently, the described example embodiments merely represent a part, instead of all, of the example embodiments of the present disclosure. All other example embodiments obtained by those skilled in the art based on the example embodiments of the present disclosure without making inventive efforts should fall within the scope of protection of the present disclosure.

It should be noted that the terms "first," "second," and the like in the specification, claims and the above figures of the present disclosure are used for distinguishing between similar objects, but are not necessarily used for describing a sequence or sequential order. It should be understood that the data thus employed are interchangeable in appropriate contexts, so that the example embodiments of the present disclosure described herein can be implemented in a sequence except for the sequences illustrated or described herein. Furthermore, the terms "comprising," "having," and any variation thereof are intended to cover non-exclusive inclusion. For example, a process, method, system, product, or device including a series of steps or units is not necessarily limited to those expressly listed steps or units, but may include other steps or units which are not expressly listed or are inherent to such process, method, product, or device.

First, a part of nouns or terms arising in the process of describing the example embodiments of the present disclosure are explained below:

Trusted computing: which is a widely used trusted computing platform supported by a hardware-based security module in a computing and communication system, to improve overall security of the system.

Trusted platform module or trusted platform control module (TPM/TPCM): which is a security chip providing integrity and authenticity guarantee for evidences and is generally mandatorily bound to a computing platform in a physical manner.

Trust for measurement: the practical method of which is integrity measurement, which means to calculate a hash value of a code using a hashing function, compare with a stored hash value to find whether the code is changed, and systematically make corresponding determination based on the comparison result.

Static trust for measurement: which is involved in establishing a trust chain during system startup, and the trust chain will no longer evaluated after completing the system startup as well as during system running.

Dynamic trust for measurement: which means performing dynamic trust for measurement of a measurement target whenever receiving a Trust for measurement request.

FPGA (full name: Field-Programmable Gate Array): which is a programmable logic device of high performance and low power consumption, is not a traditional von Neumann architecture, directly generates a circuit to perform algorithm calculation, can be pertinently designed based on algorithm and algorithm indicators, has very high execution efficiency and computing efficiency, and is very applicable to an online identification system paying close attention to the execution efficiency. The ASIC chip is a special purpose chip, which has the highest computing performance and efficiency, but suffers from a long development period and high R&D costs and is very hard to be adapted to the field of deep learning algorithms that is being fast iterative at present.

Trusted high-speed data encryption card (THSDEC): which is a data encryption card having a trusted function.

According to an example embodiment of the present disclosure, an example embodiment of a method for measurement processing of a cryptographic operation is further provided. It should be noted that steps shown in a flowchart of the accompanying drawings can be executed in, e.g., a computer system of a series of computer executable instructions, and while a logical sequence is shown in the flowchart, the steps shown or described may be executed in a sequence different from the sequences shown herein in some cases.

The method example embodiment provided in an example embodiment of the present disclosure may be executed in a mobile terminal, computer terminal or similar computing device.

FIG. 1 shows a block diagram of hardware configuration of a computer terminal (or mobile device) for implementing a method for measurement processing of a cryptographic operation.

As shown in FIG. 1, a computer terminal 100 (such as a mobile device) may include one or more processors (shown as 102a, 102b, . . . , 102n in FIG. 1, wherein n may be any integer) (the processor(s) 102 may include, but is not limited to, a processing apparatus such as a microprocessor (MCU) or a programmable logic device (FPGA)), a memory 104 configured to store data, and a transmission apparatus 106 for communication functions. In addition, the computer terminal 100 may also include: a bus interface 108, an input/output interface (I/O interface) 110. The bus interface 108 transmits data between the processor 102, the memory 104, the transmission apparatus 106, and the input/output interface 110. For example, a universal serial bus (USB) port may be included as one of the ports of the I/O interface 110. The computer terminal 100 may also include a network interface, a power supply and/or a camera (not shown in FIG. 1). It will be understood by those skilled in the art that the structure shown in FIG. 1 is merely illustrative and does not limit the structure of the above electronic device. For example, the computer terminal 100 may also include more or fewer components than those shown in FIG. 1 or have a configuration different from that shown in FIG. 1.

It should be noted that the one or more processors 102 and/or other data processing circuits may generally be referred to as "data processing circuits" in the present disclosure. The data processing circuit may be embodied completely or partially as software, hardware, firmware or any other combination. Moreover, the data processing circuit may be a single, independent determining module, or incorporated completely or partially into any of other elements in the computer terminal 100. As referred to in the example embodiment of the present disclosure, the data processing circuit works as a processor to control, e.g., selection of a variable resistance terminal path connected to the interface.

The memory 104 may be configured to store software programs and modules of application software, such as computer-readable instructions 112 or data storage apparatus 114 corresponding to the file processing method in the example embodiment of the present disclosure. The processor 102 executes the software programs and modules stored in the memory 104, thus performing various functional applications and data processing, that is, implementing the file processing method. The memory 104 may include a high-speed random-access memory and may also include a non-volatile memory, such as one or more magnetic storage apparatuses, a flash memory, or other non-volatile solid-state memories. In some examples, the memory 104 may further include memories placed remote to the processor 102. These remote memories may be connected to the computer terminal 100 over a network. Examples of the network include, but are not limited to, the Internet, an intranet, a local area network, a mobile communication network, and a combination thereof.

The transmission apparatus 106 is configured to receive or send data via a network. A specific example of the network may include a wire and/or wireless network 116 provided by a communication provider of the computer terminal 100. In one example, the transmission apparatus 106 includes a Network Interface Controller (NIC) that may be connected to other network devices through a base station to communicate with the Internet. In one example, the transmission apparatus 106 may be a Radio Frequency (RF) module for communicating with the Internet wirelessly.

The input/out interface interacts with one or more peripheral device such as a display 118, a keyboard 120, and a cursor control device 122 such as a mouse.

The display 118 may be, for example, a touch screen-type liquid crystal display (LCD) that allows a user to interact with a user interface of the computer terminal 100.

It should be noted here that, in some optional example embodiments, the computer device (or the mobile device) shown in FIG. 1 may include hardware elements (including circuits), software elements (including computer codes stored on a computer readable medium), or a combination of both hardware and software elements. It should be noted that FIG. 1 is only an example, and is intended to show the types of components that may be present in the computer device (or the mobile device).

Figure 2:
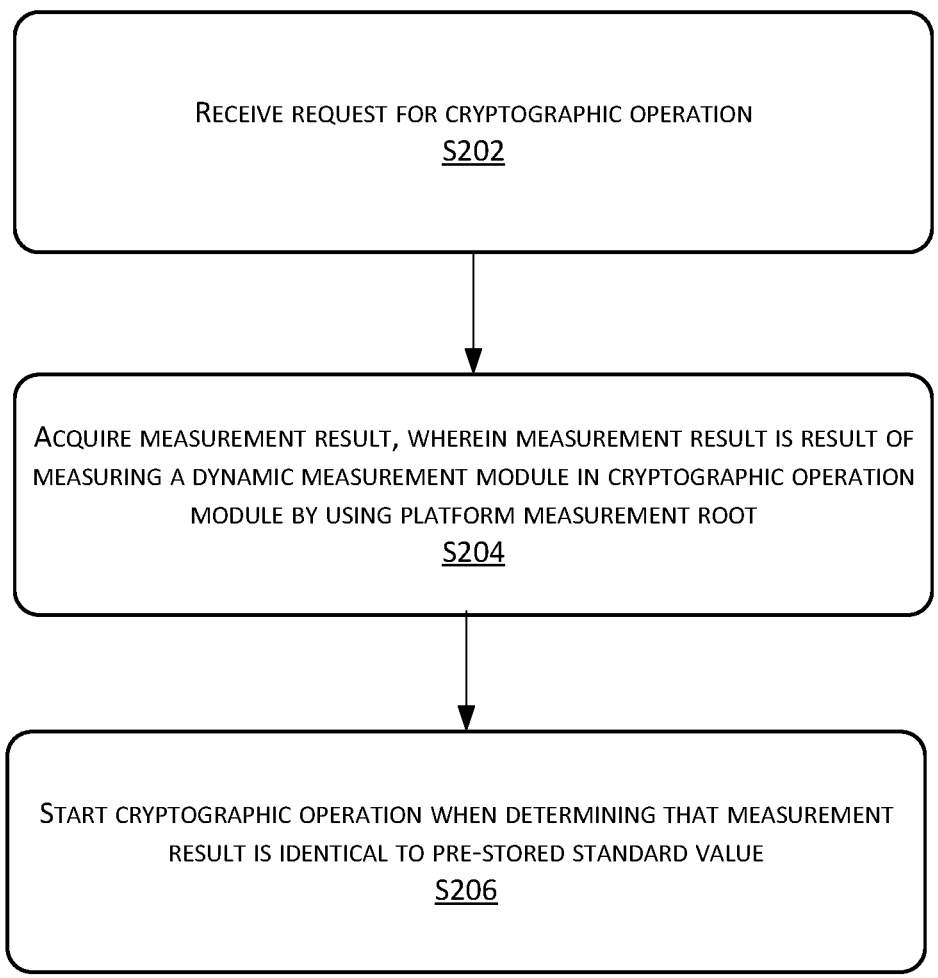
FIG. 2 is a flowchart of a method for measurement processing of a cryptographic operation according to an example embodiment of the present disclosure.

In the above operating environment, the present disclosure provides a method for measurement processing of a cryptographic operation as shown in FIG. 2. FIG. 2 is a flowchart of the method for measurement processing of a cryptographic operation according to an example embodiment of the present disclosure. As shown in FIG. 2, the method may include the following steps:

Step S202: a security chip receives a cryptographic operation request.

For example, the cryptographic operation request is used for triggering a cryptographic operation module to start the cryptographic operation.

For example, the security chip may be a TPM/TPCM in a trusted high-speed encryption card.

As an alternative example embodiment, the security chip receiving a cryptographic operation request at least includes one of the following conditions: the security chip receiving the cryptographic operation request via a trusted software base; and the security chip receiving the cryptographic operation request via a trusted software stack.

Alternatively, in the case that the security chip is the TPCM, the security chip can receive the cryptographic operation request via a trusted software base (TSB); and in the case that the security chip is the TPM, the security chip can receive the cryptographic operation request via a trusted software stack (TSS).

In the above example embodiments of the present disclosure, different solutions of receiving the cryptographic operation request based on the trusted software base and the trusted software stack are provided to meet different user needs of the security chip being the TPCM or the TPM, and improve the scope of application of the method for measurement processing of a cryptographic operation.

As an alternative example embodiment, after the security chip receives the cryptographic operation request, the method further includes: authenticating the cryptographic operation request, and after the authenticating is successful, entering the step of the security chip acquiring a measurement result of measuring a dynamic measurement module in a cryptographic operation module by using a platform measurement root.

In the above example embodiments of the present disclosure, after receiving the cryptographic operation request, the cryptographic operation request is authenticated to validate permission to access the cryptographic operation request, and after the cryptographic operation request is authenticated successfully, the measurement result of the dynamic measurement module is acquired to guarantee that the security chip receives the cryptographic operation request safely and efficiently.

Step S204: the security chip acquires a measurement result, wherein the measurement result is a result of measuring a dynamic measurement module in a cryptographic operation module by using a platform measurement root.

In the above step S204, the platform measurement root may be stored in the security chip, and the platform measurement root measures the dynamic measurement module in the cryptographic operation module to implement dynamic measurement of the cryptographic operation module.

For example, the dynamic measurement module is a module configured to measure cryptographic operation related firmware during the cryptographic operation.

The dynamic measurement module may refer to hardware, software, or both. Based on the context, the dynamic measure module may just refer to software portion. The hardware portion is configured to perform dynamic measurement and a software portion configured to perform dynamic measurement, where the hardware portion mainly includes some processors configured to perform dynamic measurement, a display, a memory, and the like. The software portion mainly includes some program codes configured to perform dynamic measurement, and the program codes may be functional codes that are compiled using various predefined programming languages.

For example, the measurement result is a result of measuring the computer-executable instructions or files or data stored in the dynamic measurement module in the cryptographic operation module by using the platform measurement root.

As an alternative example embodiment, the security chip acquiring a measurement result of measuring a dynamic measurement module in a cryptographic operation module by using a platform measurement root includes: the security chip loading the platform measurement root and the dynamic measurement module to a host processor; and the security chip receiving the measurement result of measuring the dynamic measurement module by the host processor using the platform measurement root. For example, the loading of the dynamic measure module refers to loading the program codes stored in the dynamic measurement module.

In the above example embodiments of the present disclosure, the platform measurement root and the dynamic measurement module can be loaded to the host processor, the measuring the dynamic measurement module is executed by a host server, and then the measurement result returned by the host processor is received, thereby achieving acquiring the measurement result.

Alternatively, the security chip loading the platform measurement root and the dynamic measurement module to a host processor includes: the security chip encrypting the platform measurement root and the dynamic measurement module by using a private key of a measurement root secret key to obtain encrypted data; and the security chip loading the encrypted data to the host processor. For example, the encrypting the dynamic measure module refers to encrypting the program codes stored in the dynamic measure module.

As another alternative example embodiment, the security chip acquiring a measurement result of measuring a dynamic measurement module in a cryptographic operation module by using a platform measurement root includes: the security chip sending the platform measurement root and the dynamic measurement module to the host processor; and the security chip receiving the measurement result of measuring the dynamic measurement module by the host processor using the platform measurement root.

According to the above example embodiments of the present disclosure, in a process of loading the platform measurement root and the dynamic measurement module to the host processor, the platform measurement root and the dynamic measurement module are encrypted using the private key of the measurement root secret key, and then the encrypted data are transmitted, thereby guaranteeing the security of transmitting the platform measurement root and the dynamic measurement module between the security chip and the host processor.

Alternatively, the security chip receiving the measurement result of measuring the dynamic measurement module by the host processor using the platform measurement root includes: the security chip receiving an encrypted measurement result of encrypting the measurement result by the host processor using a public key of the measurement root secret key, where the host processor, after receiving the encrypted data, decrypts the encrypted data using the public key of the measurement root secret key to obtain the platform measurement root and the dynamic measurement module, and measures the dynamic measurement module using a decrypted platform measurement root to obtain the measurement result.

According to the above example embodiments of the present disclosure, the host processor, after receiving the encrypted data sent by the security chip, decrypts the encrypted data using the public key of the measurement root secret key to obtain the platform measurement root and the dynamic measurement module, measures the dynamic measurement module to obtain the measurement result, then encrypts the measurement result using the public key of the measurement root secret key to obtain an encrypted measurement result, and then sends the encrypted measurement result to the security chip, thereby guaranteeing the security of transmitting the measurement result between the security chip and the host processor.

Alternatively, the security chip loading the encrypted data to the host processor includes: the security chip loading the encrypted data to a system memory, for the host processor to read the encrypted data from the system memory.

For example, in a process during which the security chip loads the encrypted data to the host processor, decrypted data may be first loaded to the system memory of a host, and then the host processor reads the encrypted data from the system memory, thereby achieving loading the encrypted data.

Still alternatively, the security chip loading the encrypted data to the host processor includes: the security chip sending the encrypted data to the system memory, for the host processor to read the encrypted data from the system memory.

As another alternative example embodiment, the security chip acquiring a measurement result of measuring a dynamic measurement module in a cryptographic operation module by using a platform measurement root includes: the security chip measuring the dynamic measurement module in the cryptographic operation module by using the platform measurement root to obtain the measurement result.

In the above example embodiments of the present disclosure, the security chip can directly measure the dynamic measurement module in the cryptographic operation module by using the platform measurement root to directly obtain the measurement result without the need for host processor parameters, thereby reducing a number of iterations of data transmission during the measurement, so that the measurement process is safer, and an accurate measurement result can be obtained.

Step S206: the security chip starts a cryptographic operation when determining that the measurement result is identical to a pre-stored standard value.

In the above step S206, the security chip can compare the measurement result with the pre-stored value, determine integrity of the dynamic measurement module being good when the measurement result is identical to the pre-stored standard value, and then start the cryptographic operation to ensure dynamic trust for measurement of the cryptographic operation.

In the example embodiments of the present disclosure, a security chip receives a cryptographic operation request, then measures a dynamic measurement module in a cryptographic operation module by using a platform measurement root to obtain a measurement result, compares the measurement result with a pre-stored standard value, and then starts the cryptographic operation in the case that the measurement result is identical to the pre-stored standard value. Since the cryptographic operation request is a trigger instruction for starting a cryptographic operation, the security chip, after receiving the cryptographic operation request, can first verify whether the measurement result of dynamic measurement on the cryptographic operation module complies with the pre-stored standard value, and then start a cryptographic operation after the verification is successful, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

As an alternative example embodiment, before the security chip starting a cryptographic operation when it is determined that the measurement result is identical to a pre-stored standard value, the method further includes: the security chip triggering a trusted module of a system platform and the dynamic measurement module to preset a secret key for cryptographic operation measurement, where the secret key for cryptographic operation measurement is used for the cryptographic operation.

It should be noted that, as mentioned above, the above processing of loading can be completed by sending in a general sense. For example, the security chip loading the platform measurement root and the dynamic measurement module to the system memory may be the security chip sending the platform measurement root and the dynamic measurement module to the system memory; and the security chip loading the encrypted data obtained by encrypting the platform measurement root and the dynamic measurement module to the system memory may be the security chip sending the encrypted data to the system memory.

In the above example embodiments of the present disclosure, when determining the measurement result being identical to the pre-stored standard value, the security chip can trigger the system platform and the dynamic measurement module to synchronously preset a secret key for cryptographic operation measurement, and then perform the cryptographic operation based on the secret key for cryptographic operation measurement.

Figure 3:
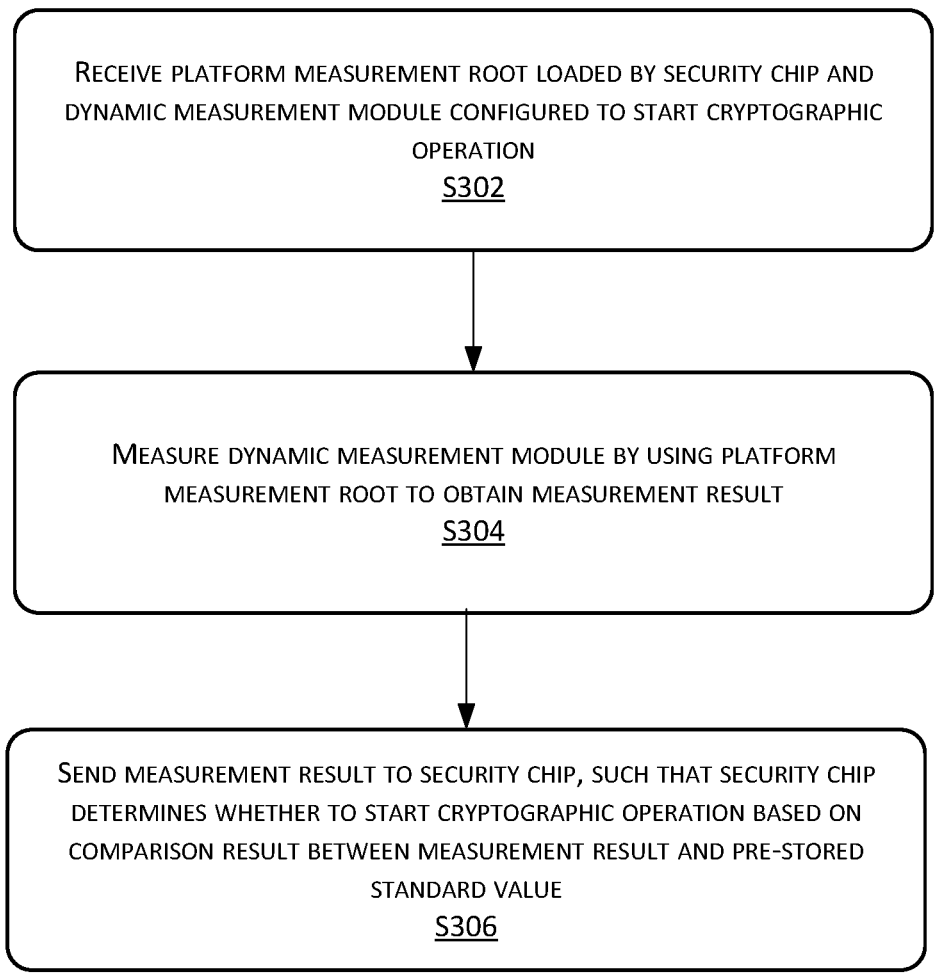
FIG. 3 is a flowchart of the method for measurement processing of a cryptographic operation according to an example embodiment of the present disclosure.

In the above operating environment, the present disclosure provides a method for measurement processing of a cryptographic operation as shown in FIG. 3. FIG. 3 is a flowchart of the method for measurement processing of a cryptographic operation according to an example embodiment of the present disclosure. As shown in FIG. 3, the method may include the following steps:

Step S302: a host processor receives a platform measurement root loaded by a security chip and a dynamic measurement module configured to start a cryptographic operation;

Step S304: the host processor measures the dynamic measurement module by using the platform measurement root to obtain a measurement result; and Step S306: the host processor sends the measurement result to the security chip, such that the security chip determines whether to start a cryptographic operation based on a comparison result between the measurement result and a pre-stored standard value.

In the example embodiments of the present disclosure, a host processor receives a platform measurement root loaded by a security chip and a dynamic measurement module, then measures the dynamic measurement module by using the platform measurement root to obtain a measurement result, and sends the measurement result to the security chip; the security chip compares the measurement result with a pre-stored standard value to obtain a comparison result, and then determines whether to start a cryptographic operation based on the comparison result, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

Alternatively, the host processor receiving a platform measurement root loaded by the security chip and a dynamic measurement module configured to start a cryptographic operation includes: the host processor receiving encrypted data obtained after encrypting the platform measurement root and the dynamic measurement module by the security chip using a private key of a measurement root secret key.

Alternatively, before the host processor measuring the dynamic measurement module by using the platform measurement root to obtain a measurement result, the method further includes: the host processor decrypting the encrypted data using a public key of the measurement root secret key to obtain the platform measurement root and the dynamic measurement module.

Alternatively, the host processor sending the measurement result to the security chip includes: the host processor encrypting the measurement result using the public key of the measurement root secret key to obtain an encrypted measurement result and sending the encrypted measurement result to the security chip.

According to the above example embodiments of the present disclosure, transmitting the encrypted data and the encrypted measurement result between the host processor and the security chip can guarantee the security of data transmission between the host processor and the security chip.

Figure 4:
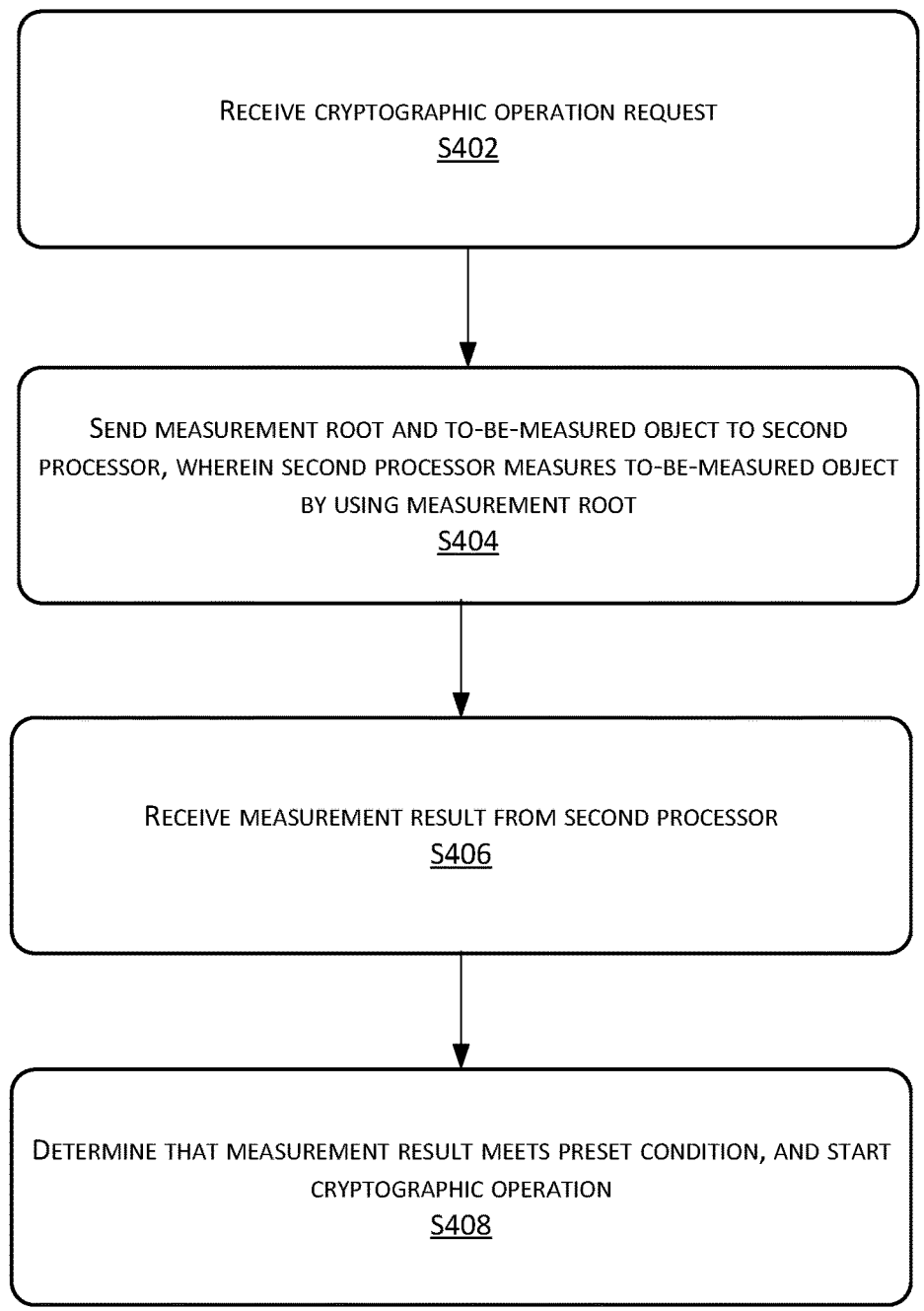
FIG. 4 is a flowchart of a method for data processing according to an example embodiment of the present disclosure.

In the above operating environment, the present disclosure provides a method for measurement processing of a cryptographic operation as shown in FIG. 4. FIG. 4 is a flowchart of a method for data processing according to an example embodiment of the present disclosure. As shown in FIG. 4, the method may include the following steps:

Step S402: a first processor receives a cryptographic operation request;

Step S404: the first processor sends a measurement root and a to-be-measured object to a second processor, wherein the second processor measures the to-be-measured object by using the measurement root;

Step S406: the first processor receives a measurement result from the second processor; and Step S408: the first processor determines that the measurement result meets a preset condition, and starts a cryptographic operation.

In the example embodiments of the present disclosure, after receiving a cryptographic operation request, a first processor sends a measurement root and a to-be-measured object to a second processor; the second processor measures the to-be-measured object based on the measurement root; after the second processor completes measuring the to-be-measured object, the first processor will combine with the measurement result returned by the second processor, determine whether the measurement result meets a predetermined condition, and start a cryptographic operation in the case that the measurement result meets the predetermined condition, achieving the purpose of verifying the measurement result of dynamic measurement on a cryptographic operation module, so that whether the measurement result of dynamic measurement is trustable can be determined by comparing the measurement result with the predetermined condition, thereby guaranteeing a technical effect of dynamic trust for measurement of a cryptographic operation, and then solving the technical problem of failure to guarantee a dynamic trust for measurement code when starting dynamic measurement of a cryptographic operation.

As an alternative example embodiment, the measurement root is used as a trusted value for integrity measurement, and the measurement root includes a platform measurement root based on a trusted platform.

For example, the measurement root may be a platform measurement root predetermined based on the trusted platform, and platform integrity can be detected based on the measurement root.

As an alternative example embodiment, the first processor includes a security chip, and the second processor includes a host processor of a system.

As an alternative example embodiment, the measuring the to-be-measured object by using the measurement root includes: calculating the to-be-measured object by using the measurement root to obtain a hash value (e.g., obtaining a hash value by hashing) of the to-be-measured object, comparing the hash value with a preset hash value to obtain a comparison result, and determining whether the integrity of the to-be-measured object has been destroyed based on the comparison result.

For example, the to-be-measured object can be calculated using the measurement root to obtain the hash value of the to-be-measured object, and the hash value is compared with the preset hash value to obtain the comparison result, and then whether the integrity of the to-be-measured object has been destroyed can be determined based on the comparison result, thereby implementing measurement of the to-be-measured object.

The present disclosure further provides a preferred example embodiment. The preferred example embodiment provides a method for starting dynamic measurement of a cryptographic operation.

Figure 5:
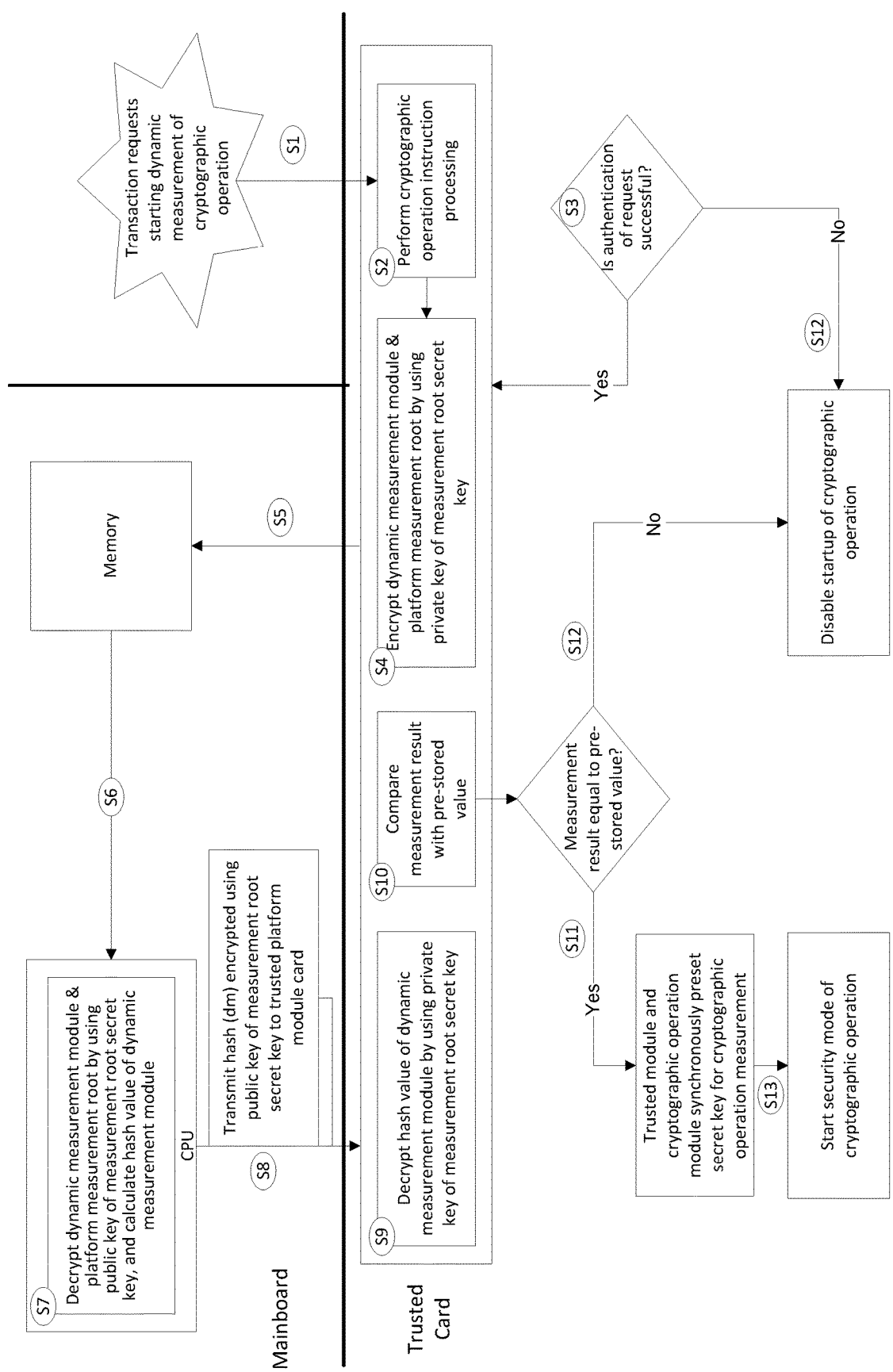
FIG. 5 is a schematic diagram of a method and flowchart for starting dynamic measurement of a cryptographic operation based on a local CPU according to an example embodiment of the present disclosure.

FIG. 5 is a schematic diagram of a method and flowchart for starting dynamic measurement of a cryptographic operation based on a local CPU according to an example embodiment of the present disclosure. As shown in FIG. 5, the steps are as follows:

S1: a transaction sends a cryptographic operation request to a TPCM of a trusted chip via a trusted software base (TSB) (in the case of a TPM chip, the transaction sends the cryptographic operation request to a TPM via a trusted software stack (TSS)).

S2: the trusted module performs cryptographic operation instruction processing, the instruction processing referring to receiving the cryptographic operation request and performing authentication.

S3: whether an authentication of the request is successful is determined. S4 is executed when the authentication is successful, otherwise, S12 is executed.

S4: a dynamic measurement module firmware & a platform measurement root are encrypted by using a private key of a measurement root secret key.

S5: an encrypted result in step S4 is loaded into a host memory.

S6: the encrypted result is then loaded from the host memory into a host CPU.

S7: the host CPU performs the following acts:

a) decrypting loaded encrypted data using a public key of a platform measurement root secret key; and b) executing a platform measurement root code, and hashing the dynamic measurement module firmware to obtain hash (dm).

It should be noted that the dm denotes the dynamic measurement module firmware, and the hash (dm) is a measurement result of measuring a dynamic measurement module in a cryptographic operation module.

c) encrypting the hash (dm) using the public key of the measurement root secret key.

S8: the hash (dm) encrypted using the public key of the measurement root secret key is transmitted to a trusted platform module card.

S9: the trusted platform module card invokes a decrypting module to obtain the hash (dm). The decrypting module decrypts the hash value of the dynamic measurement module by using the private key of the measurement root secret key S10: the trusted platform module card compares the obtained hash value with a pre-stored value such as a Platform Configuration Register (PCR) value.

S11: the integrity of the dynamic measurement module is determined satisfactory if the obtained hash value is equal to the pre-stored PCR value, a trusted platform module negotiates with the dynamic measurement module for synchronously presetting a secret key for cryptographic operation measurement, otherwise, the dynamic measurement is determined destroyed, and S12 is executed.

S12: startup of the cryptographic operation is disabled.

S13: a security mode of the cryptographic operation is started.

Figure 6:
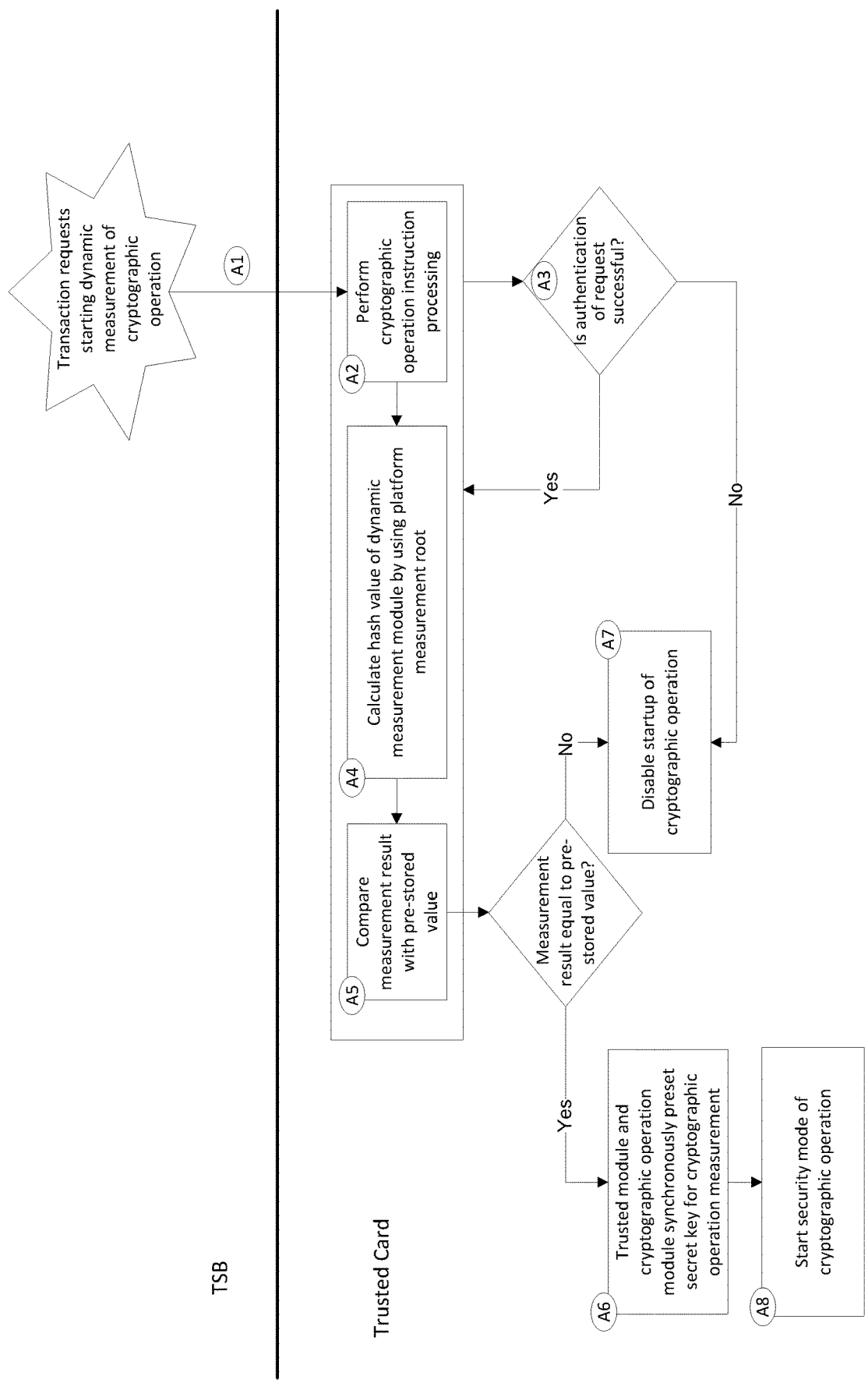
FIG. 6 is a schematic diagram of the method and flowchart for starting dynamic measurement of a cryptographic operation based on a local CPU according to an example embodiment of the present disclosure.

FIG. 6 is a schematic diagram of the method and flowchart for starting dynamic measurement of a cryptographic operation based on a local CPU according to an example embodiment of the present disclosure. As shown in FIG. 6, the steps are as follows:

A1: a transaction sends a cryptographic operation request to a TPCM of a trusted chip via a trusted software base (TSB) (in the case of a TPM chip, the transaction sending the cryptographic operation request to a TPM via a trusted software stack (TSS)).

A2: the trusted module performs cryptographic operation instruction processing, the instruction processing referring to receiving the cryptographic operation request and performing authentication.

A3: whether an authentication of the request is successful is determined. A4 is executed when the authentication is successful, otherwise, A7 is executed.

A4: a dynamic measurement module firmware & a platform measurement root are encrypted by using a private key of a measurement root secret key. A hash value of a dynamic measurement module is calculated by using a platform measurement root.

A5: the trusted platform module card compares the obtained hash value with a pre-stored value such as a pre-stored PCR value.

A6: the integrity of the dynamic measurement module is determined satisfactory if the obtained hash value is equal to the pre-stored value, the trusted platform module negotiates with the dynamic measurement module for synchronously presetting a secret key for cryptographic operation measurement; otherwise, the dynamic measurement module is determined destroyed, and A7 is executed.

A7: startup of the cryptographic operation is disabled.

A8: a security mode of the cryptographic operation is started.

The method for starting dynamic measurement of a cryptographic operation provided in the present disclosure can guarantee the integrity of the dynamic measurement module in a cryptographic operation module by using the platform measurement root of a trusted module; can guarantee trusted loading and trusted execution of a dynamic measurement code using a public key and a private key of the platform measurement root in a process of dynamic measurement of the cryptographic operation; and can also get ready for subsequent dynamic measurement of the cryptographic operation using a preset platform measurement secret key.

It should be noted that, for the aforementioned example embodiments of the method, for the ease of description, the example embodiments are all expressed as combinations of a series of actions, but those skilled in the art should understand that the present disclosure is not limited by the described sequences of actions, because some steps may be performed in other sequences or simultaneously according to the present disclosure. Then, those skilled in the art should also understand that the example embodiments described in the specification are all preferred example embodiments, and the involved actions and modules are not necessarily required by the present disclosure.

Through the above description of the example embodiments, those skilled in the art can clearly understand that the method according to the above example embodiments can be implemented by software with the addition of a necessary general-purpose hardware platform, and of course, may also be implemented by hardware, but in many cases, the former is a better implementation. Based on such understanding, the technical solution of the present disclosure may be essentially reflected or a part thereof making contribution to the prior art may be reflected in the form of software products. The computer software products can be stored in a storage medium, e.g., a ROM/RAM, a magnetic disk, an optical disk, or the like, including a number of instructions for causing a terminal device (which may be a mobile phone, a computer, a server, a network device, or the like) to execute the method according to the example embodiments of the present disclosure.

According to the example embodiments of the present disclosure, an apparatus for measurement processing of a cryptographic operation configured to implement the above method for measurement processing of a cryptographic operation is further provided.

Figure 7:
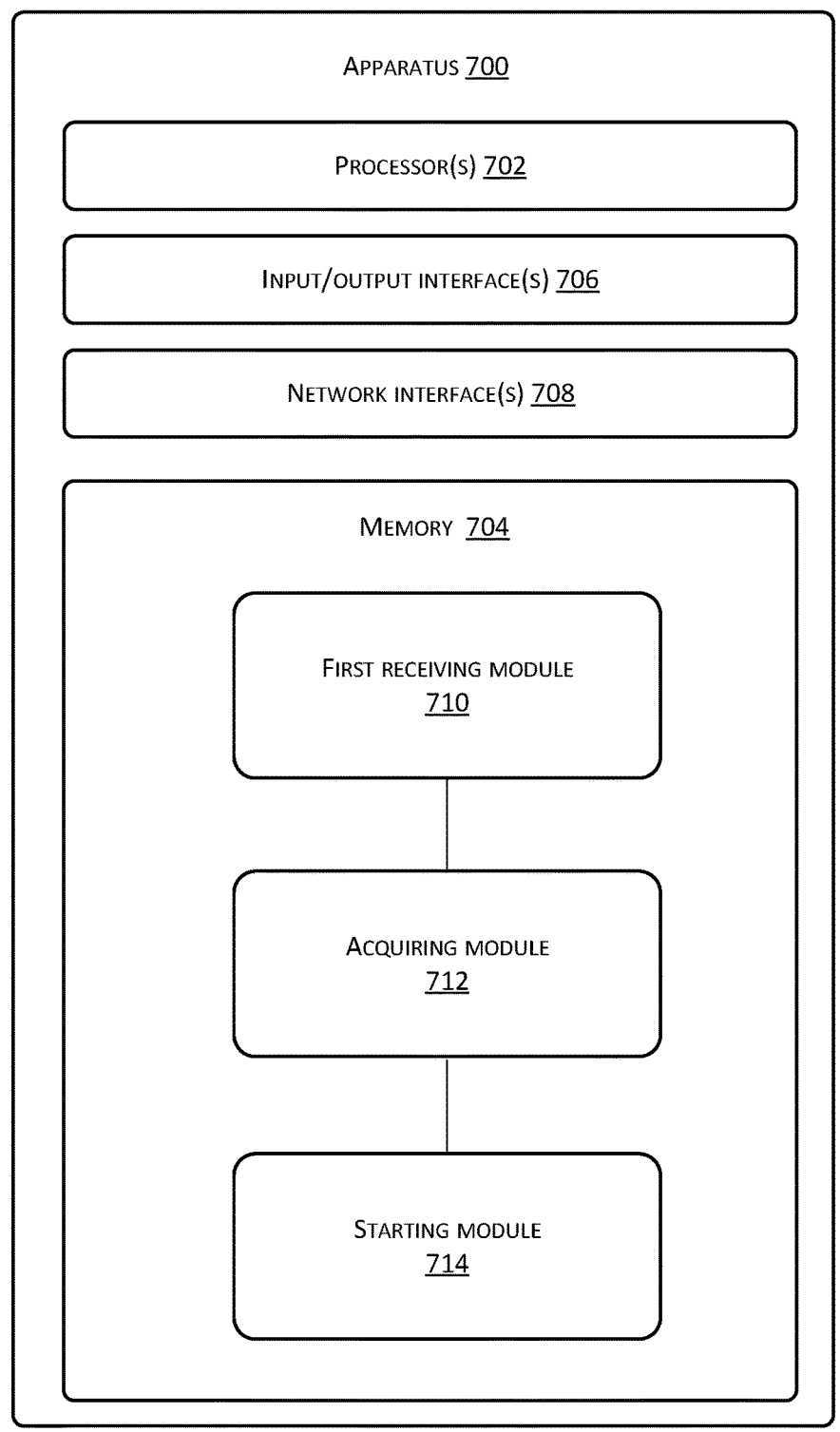
FIG. 7 is a schematic diagram of an apparatus for measurement processing of a cryptographic operation according to an example embodiment of the present disclosure.

As shown in FIG. 7, an apparatus 700 includes one or more processor(s) 702 or data processing unit(s) and memory 704. The apparatus 700 may further include one or more input/output interface(s) 706 and one or more network interface(s) 708. The memory 704 is an example of computer readable medium or media.

The computer readable medium includes non-volatile and volatile media as well as movable and non-movable media, and may store information by means of any method or technology. The information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and may be used to store information accessible to the computing device. According to the definition in this text, the computer readable medium does not include transitory media, such as a modulated data signal and a carrier.

The memory 704 may store therein a plurality of modules or units including a first receiving module 710, an acquiring module 712, and a starting module 714.

The first receiving module 710 is configured to receive a cryptographic operation request; the acquiring module 712 is configured in a security chip to acquire a measurement result, wherein the measurement result is a result of measuring a dynamic measurement module in a cryptographic operation module by using a platform measurement root; and the starting module 714 is configured to start a cryptographic operation when it is determined that the measurement result is identical to a pre-stored standard value.

Here, it should be noted that the first receiving module 710 corresponds to the step S202 in the above example method embodiment, the acquiring module 712 corresponds to the step S204 in the above example method embodiment, and the starting module 714 corresponds to the step S206 in the above example method embodiment. The examples implemented by and the application scenarios of the above modules are identical to the examples implemented in and the application scenarios of the corresponding steps but are not limited to the contents disclosed in the above example method embodiment. It should be noted that the above modules, as a part of the apparatus, may run in the computer terminal 100 provided in the above example method embodiment.

In the example embodiments of the present disclosure, a security chip receives a cryptographic operation request, then measures a dynamic measurement module in a cryptographic operation module by using a platform measurement root to obtain a measurement result, compares the measurement result with a pre-stored standard value, and then starts the cryptographic operation in the case that the measurement result is identical to the pre-stored standard value. Since the cryptographic operation request is a trigger instruction for starting a cryptographic operation, the security chip, after receiving the cryptographic operation request, can first verify whether the measurement result of dynamic measurement on the cryptographic operation module complies with the pre-stored standard value, and then start a cryptographic operation after the verification is successful, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

According to the example embodiments of the present disclosure, an apparatus for measurement processing of a cryptographic operation configured to implement the above method for measurement processing of a cryptographic operation is further provided.

Figure 8:
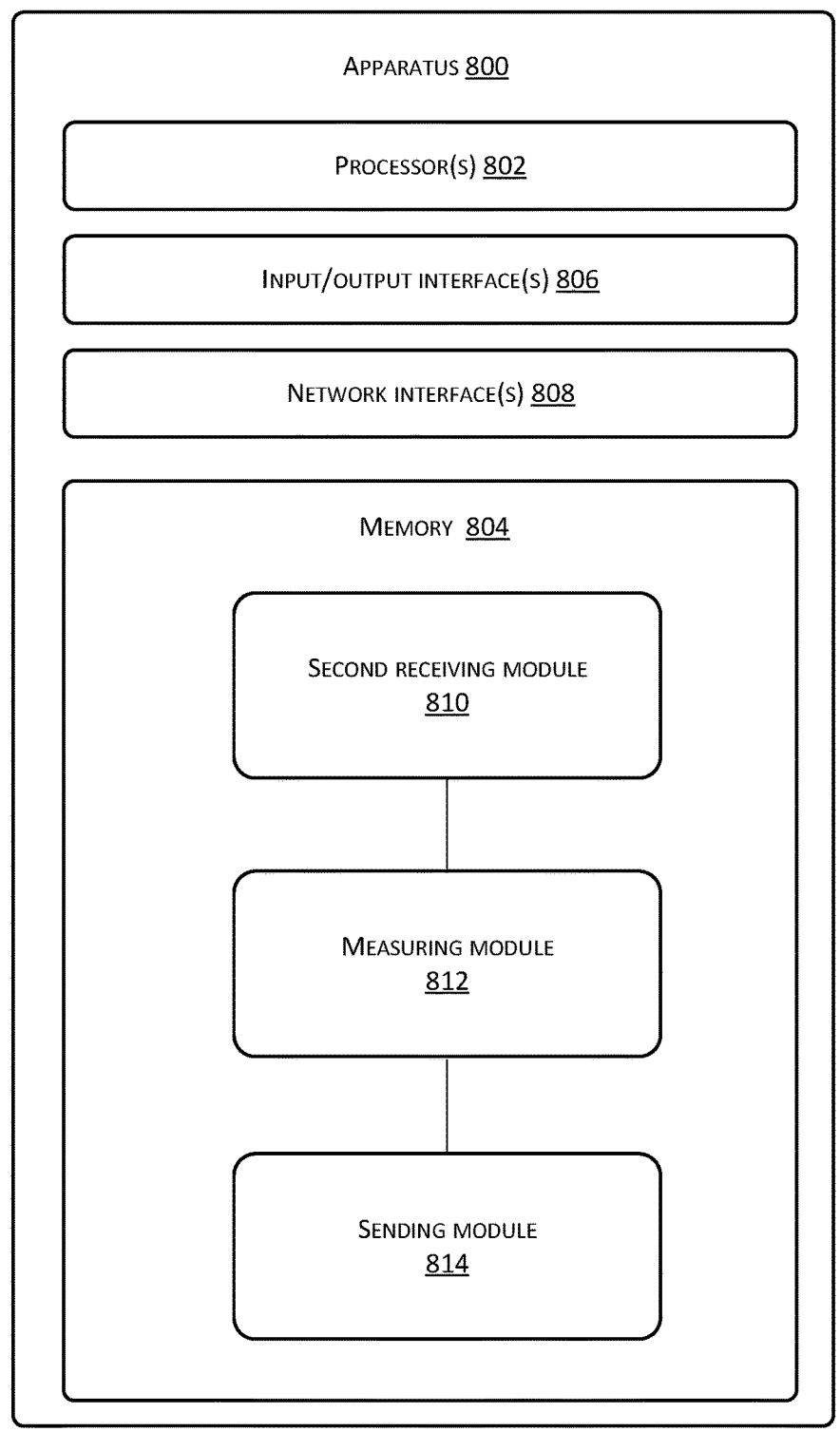
FIG. 8 is a schematic diagram of the apparatus for measurement processing of a cryptographic operation according to an example embodiment of the present disclosure.

As shown in FIG. 8, an apparatus 800 is applied to a host compressor. The apparatus 800 includes one or more processor(s) 802 or data processing unit(s) and memory 804. The apparatus 800 may further include one or more input/output interface(s) 806 and one or more network interface(s) 808. The memory 804 is an example of computer readable medium or media.

The memory 804 may store therein a plurality of modules or units including a second receiving module 810, a measuring module 812, and a sending module 814.

The second receiving module 810 is configured to receive a platform measurement root loaded by a security chip and a dynamic measurement module configured to start a cryptographic operation; the measuring module 812 is configured to measure the dynamic measurement module by using the platform measurement root to obtain a measurement result; and the sending module 814 is configured to send the measurement result to the security chip, such that the security chip determines whether to start a cryptographic operation based on a comparison result between the measurement result and a pre-stored standard value.

Here, it should be noted that the second receiving module 810 corresponds to the step S302 in the above example method embodiment, the measuring module 812 corresponds to the step S304 in the above example method embodiment, and the sending module 814 corresponds to the step S306 in the above example method embodiment. The examples implemented by and the application scenarios of the above modules are identical to the examples implemented in and the application scenarios of the corresponding steps but are not limited to the contents disclosed in the above example method embodiment. It should be noted that the above modules, as a part of the apparatus, may run in the computer terminal 100 provided in the above example method embodiment.

In the example embodiments of the present disclosure, a host processor receives a platform measurement root loaded by a security chip and a dynamic measurement module, then measures the dynamic measurement module by using the platform measurement root to obtain a measurement result, and sends the measurement result to the security chip; the security chip compares the measurement result with a pre-stored standard value to obtain a comparison result, and then determines whether to start a cryptographic operation based on the comparison result, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

Figure 9:
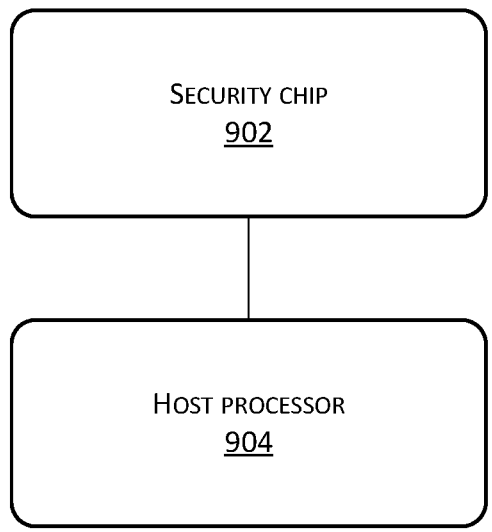
FIG. 9 is a schematic diagram of a system for measurement processing of a cryptographic operation according to an example embodiment of the present disclosure.

According to the example embodiments of the present disclosure, a system for measurement processing of a cryptographic operation configured to implement the above method for measurement processing of a cryptographic operation is further provided. As shown in FIG. 9, the system includes: a security chip 902, and a host processor 904.

The security chip 902 is configured to receive a cryptographic operation request; and load, in response to the cryptographic operation request, a platform measurement root and a dynamic measurement module configured to start a cryptographic operation in a cryptographic operation module to the host processor; the host processor 904 is configured to measure the dynamic measurement module by using the platform measurement root to obtain a measurement result, and send the measurement result to the security chip; and the security chip 902 is further configured to determine whether to start a cryptographic operation based on a comparison result between the measurement result and a pre-stored standard value.

In the example embodiments of the present disclosure, a security chip receives a cryptographic operation request, then measures a dynamic measurement module in a cryptographic operation module by using a platform measurement root to obtain a measurement result, compares the measurement result with a pre-stored standard value, and then starts the cryptographic operation in the case that the measurement result is identical to the pre-stored standard value. Since the cryptographic operation request is a trigger instruction for starting a cryptographic operation, the security chip, after receiving the cryptographic operation request, can first verify whether the measurement result of dynamic measurement on the cryptographic operation module complies with the pre-stored standard value, and then start a cryptographic operation after the verification is successful, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

As an alternative example embodiment, the security chip is configured to encrypt the platform measurement root and the dynamic measurement module by using a private key of a measurement root secret key to obtain encrypted data, and load the encrypted data to the host processor; the host processor is configured to decrypt the encrypted data by using a public key of the measurement root secret key to obtain the platform measurement root and the dynamic measurement module; the host processor is configured to encrypt the measurement result by using the public key of the measurement root secret key to obtain an encrypted measurement result, and send the encrypted measurement result to the security chip; and the security chip is configured to decrypt the encrypted measurement result by using the private key of the measurement root key to obtain the measurement result, and determine whether to start a cryptographic operation based on the measurement result obtained by decryption.

The example embodiments of the present disclosure may provide a computer terminal. The computer terminal may be any one computer terminal device in a group of computer terminals. Alternatively, in the present example embodiment, the above computer terminal may also be replaced with a terminal device, such as a mobile terminal.

Alternatively, in the present example embodiment, the above computer terminal may be at least one network device located in a plurality of network devices of a computer network. In the present example embodiment, the computer terminal can execute program codes of the following steps in the method for measurement processing of a cryptographic operation of an application program: a security chip receiving a cryptographic operation request; the security chip acquiring a measurement result of measuring a dynamic measurement module in a cryptographic operation module by using a platform measurement root; and the security chip starting a cryptographic operation when it is determined that the measurement result is identical to a pre-stored standard value.

Figure 10:
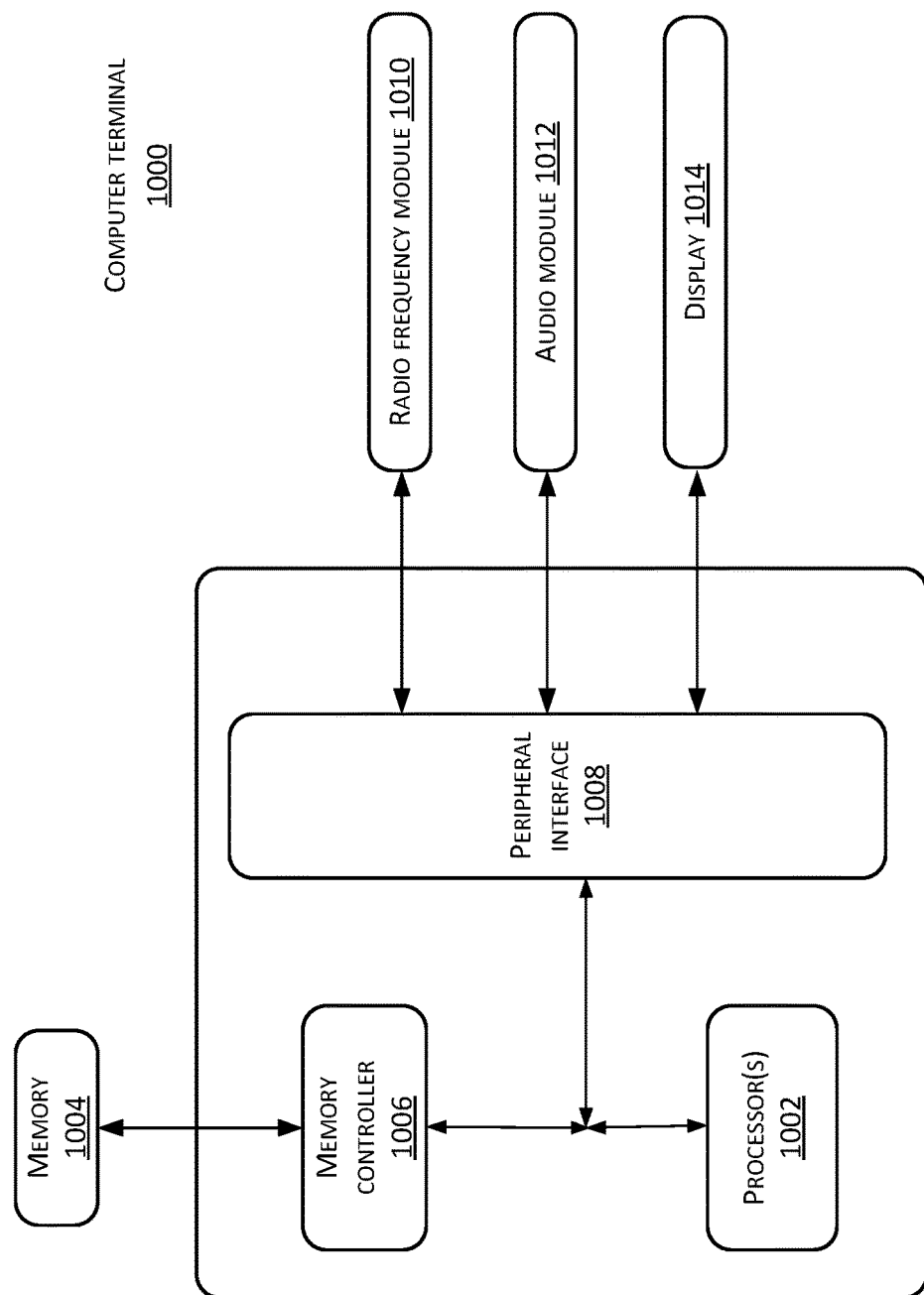
FIG. 10 is a block diagram of a computer terminal configuration according to an example embodiment of the present disclosure.

Alternatively, FIG. 10 is a block diagram of a computer terminal configuration according to an example embodiment of the present disclosure.

As shown in FIG. 10, a computer terminal 1000 may include one or more (only one is shown in the figure) processors 1002 and a memory 1004. The memory 1004 communicated with a memory controller 1006 that interacts with the processors 1002 and a peripherical interface 1008. The peripheral interface 1008 interacts with a radio frequency module 1010, an audio module 1012, and a display 1014.

The memory 1004 may be configured to store software programs and modules, such as the program instructions/modules corresponding to the file processing method and apparatus in the example embodiments of the present disclosure. The processor 902 operates the software programs and modules stored in the memory, thus performing various functional applications and data processing, that is, implementing the above file processing method. The memory 904 may include a high-speed random-access memory and may also include anon-volatile memory, such as one or more magnetic storage apparatuses, a flash memory, or other non-volatile solid-state memories. In some examples, the memory may further include memories disposed remote to the processor. These remote memories may be connected to the terminal over a network. Examples of the network include, but are not limited to, the Internet, an intranet, a local area network, a mobile communication network, and a combination thereof.

The processor 1002 may invoke information stored in the memory and application programs by a transmission apparatus, to execute the following steps: the security chip receiving the cryptographic operation request; the security chip acquiring a measurement result, wherein the measurement result is a result of measuring a dynamic measurement module in a cryptographic operation module by using a platform measurement root; and the security chip starting a cryptographic operation when it is determined that the measurement result is identical to a pre-stored standard value.

Alternatively, the processor 1002 may further execute program codes of the following steps: the security chip loading the platform measurement root and the dynamic measurement module to a host processor; and the security chip receiving the measurement result of measuring the dynamic measurement module by the host processor using the platform measurement root.

Alternatively, the processor 1002 may further execute program codes of the following steps: the security chip encrypting the platform measurement root and the dynamic measurement module by using a private key of a measurement root secret key to obtain encrypted data; the security chip loading the encrypted data to the host processor; and the security chip receiving an encrypted measurement result of encrypting the measurement result by the host processor using a public key of the measurement root secret key, where the host processor, after receiving the encrypted data, decrypts the encrypted data using the public key of the measurement root secret key to obtain the platform measurement root and the dynamic measurement module, and measures the dynamic measurement module using a decrypted platform measurement root to obtain the measurement result.

Alternatively, the processor 1002 may further execute program codes of the following steps: the security chip loading the encrypted data to a system memory, for the host processor to read the encrypted data from the system memory.

Alternatively, the processor 1002 may further execute program codes of the following steps: the security chip measuring the dynamic measurement module in the cryptographic operation module by using the platform measurement root to obtain the measurement result.

Alternatively, the processor 1002 may further execute program codes of the following steps: authenticating the cryptographic operation request, and after the authenticating is successful, entering the step of the security chip acquiring a measurement result of measuring a dynamic measurement module in a cryptographic operation module by using the platform measurement root.

Alternatively, the processor 1002 may further execute program codes of the following steps: the security chip receiving the cryptographic operation request via a trusted software base; and the security chip receiving the cryptographic operation request via a trusted software stack.

Alternatively, the processor 1002 may further execute program codes of the following steps: the security chip triggering a trusted module of a system platform and the dynamic measurement module to preset a secret key for cryptographic operation measurement, where the secret key for cryptographic operation measurement is used for the cryptographic operation.

Alternatively, the processor 1002 may further execute program codes of the following steps: the host processor receiving the platform measurement root loaded by the security chip, and the dynamic measurement module configured to start a cryptographic operation; the host processor measuring the dynamic measurement module by using the platform measurement root to obtain the measurement result; and the host processor sending the measurement result to the security chip, such that the security chip determines whether to start a cryptographic operation based on a comparison result between the measurement result and the pre-stored standard value.

Alternatively, the processor 1002 may further execute program codes of the following steps: the host processor receiving the encrypted data obtained after encrypting the platform measurement root and the dynamic measurement module by the security chip using the private key of the measurement root secret key; the host processor decrypting the encrypted data using the public key of the measurement root secret key to obtain the platform measurement root and the dynamic measurement module; and the host processor encrypting the measurement result using the public key of the measurement root secret key to obtain the encrypted measurement result, and send the encrypted measurement result to the security chip.

The processor 1002 may invoke information stored in the memory 1004 and application programs by a transmission apparatus, to execute the following steps: a first processor receiving a cryptographic operation request; the first processor sending a measurement root and a to-be-measured object to a second processor, wherein the second processor measures the to-be-measured object by using the measurement root; the first processor receiving a measurement result from the second processor; and the first processor determining that the measurement result meets a preset condition, and starting a cryptographic operation.

The processor 1002 may invoke information stored in the memory 1004 and application programs by a transmission apparatus, to execute the following steps: calculating the to-be-measured object by using the measurement root to obtain a hash value of the to-be-measured object, comparing the hash value with a preset hash value to obtain a comparison result, and determining whether the integrity of the to-be-measured object has been destroyed based on the comparison result.

The example embodiments of the present disclosure provide a method for dynamic measurement of a cryptographic operation. Since the cryptographic operation request is a trigger instruction for starting a cryptographic operation, the security chip, after receiving the cryptographic operation request, can first verify whether the measurement result of dynamic measurement on the cryptographic operation module complies with the pre-stored standard value, and then start a cryptographic operation after the verification is successful, achieving the purpose of verifying the measurement result of dynamic measurement on the cryptographic operation module, so that whether the measurement result of dynamic measurement is trustable can be determined by comparing the measurement result with the pre-stored standard value, thereby guaranteeing a technical effect of dynamic trust for measurement of a cryptographic operation, and then solving the technical problem of failure to guarantee a dynamic trust for measurement code when starting dynamic measurement of a cryptographic operation.

As will be appreciated by those of ordinary skills in the art, the structure shown in FIG. 10 is merely illustrative, and the computer terminal may also be a terminal device, such as a smart phone (e.g., an Android phone, or an iOS phone), a tablet computer, a palmtop computer, a Mobile Internet Device (MID), or a PAD. FIG. 10 does not constitute a limitation to the structure of the above electronic device. For example, the computer terminal 10 may also include more or fewer components (e.g., network interfaces, or displays) than the components shown in FIG. 10 or have different configurations from the configurations shown in FIG. 10.

As will be appreciated by those of ordinary skills in the art, all or part of steps in the methods of the above example embodiments can be completed by a program instructing relevant hardware of the terminal device, and the program may be stored in a computer readable storage medium. The storage medium may include: a flash disk, a Read-Only Memory (ROM), a Random-Access Memory (RAM), a magnetic disk, an optical disk, or the like.

The example embodiments of the present disclosure further provide a storage medium. Alternatively, in the present example embodiment, the storage medium can be configured to store the program code executed by the method for dynamic measurement of a cryptographic operation provided in the above example method embodiment.

Alternatively, in the present example embodiment, the storage medium may be located in any one computer terminal of a group of computer terminals in a computer network or be located in any one mobile terminal of a group of mobile terminals.

Alternatively, in the present example embodiment, the storage medium is configured to store program codes for executing the following steps: a security chip receiving a cryptographic operation request; the security chip acquiring a measurement result of measuring a dynamic measurement module in a cryptographic operation module by using a platform measurement root; and the security chip starting a cryptographic operation when it is determined that the measurement result is identical to a pre-stored standard value.

Alternatively, in the present example embodiment, the storage medium is configured to store program codes for executing the following steps: the security chip loading the platform measurement root and the dynamic measurement module to a host processor; and the security chip receiving the measurement result of measuring the dynamic measurement module by the host processor using the platform measurement root.

Alternatively, in the present example embodiment, the storage medium is configured to store program codes for executing the following steps: the security chip encrypting the platform measurement root and the dynamic measurement module by using a private key of a measurement root secret key to obtain encrypted data; the security chip loading the encrypted data to the host processor; and the security chip receiving an encrypted measurement result of encrypting the measurement result by the host processor using a public key of the measurement root secret key, where the host processor, after receiving the encrypted data, decrypts the encrypted data using the public key of the measurement root secret key to obtain the platform measurement root and the dynamic measurement module, and measures the dynamic measurement module using a decrypted platform measurement root to obtain the measurement result.

Alternatively, in the present example embodiment, the storage medium is configured to store program codes for executing the following steps: the security chip loading the encrypted data to a system memory, for the host processor to read the encrypted data from the system memory.

Alternatively, in the present example embodiment, the storage medium is configured to store program codes for executing the following steps: the security chip measuring the dynamic measurement module in the cryptographic operation module by using the platform measurement root to obtain the measurement result.

Alternatively, in the present example embodiment, the storage medium is configured to store program codes for executing the following steps: authenticating the cryptographic operation request, and after the authenticating is successful, entering the step of the security chip acquiring a measurement result of measuring a dynamic measurement module in a cryptographic operation module by using the platform measurement root.

Alternatively, in the present example embodiment, the storage medium is configured to store program codes for executing the following steps: the security chip receiving the cryptographic operation request via a trusted software base; and the security chip receiving the cryptographic operation request via a trusted software stack.

Alternatively, in the present example embodiment, the storage medium is configured to store program codes for executing the following steps: the security chip triggering a trusted module of a system platform and the dynamic measurement module to preset a secret key for cryptographic operation measurement, where the secret key for cryptographic operation measurement is used for the cryptographic operation.

Alternatively, in the present example embodiment, the storage medium is configured to store program codes for executing the following steps: the host processor receiving the platform measurement root loaded by the security chip, and the dynamic measurement module configured to start a cryptographic operation; the host processor measuring the dynamic measurement module by using the platform measurement root to obtain the measurement result; and the host processor sending the measurement result to the security chip, such that the security chip determines whether to start a cryptographic operation based on a comparison result between the measurement result and the pre-stored standard value.

Alternatively, in the present example embodiment, the storage medium is configured to store program codes for executing the following steps: the processor can further execute program codes of the following steps: the host processor receiving the encrypted data obtained after encrypting the platform measurement root and the dynamic measurement module by the security chip using the private key of the measurement root secret key; the host processor decrypting the encrypted data using the public key of the measurement root secret key to obtain the platform measurement root and the dynamic measurement module; and the host processor encrypting the measurement result using the public key of the measurement root secret key to obtain the encrypted measurement result, and send the encrypted measurement result to the security chip.

Alternatively, in the present example embodiment, the storage medium is configured to store program codes for executing the following steps: a first processor receiving a cryptographic operation request; the first processor sending a measurement root and a to-be-measured object to a second processor, wherein the second processor measures the to-be-measured object by using the measurement root; the first processor receiving a measurement result from the second processor; and the first processor determining that the measurement result meets a preset condition, and starting a cryptographic operation.

Alternatively, in the present example embodiment, the storage medium is configured to store program codes for executing the following steps: calculating the to-be-measured object by using the measurement root to obtain a hash value of the to-be-measured object, comparing the hash value with a preset hash value to obtain a comparison result, and determining whether the integrity of the to-be-measured object has been destroyed based on the comparison result.

The serial numbers of the above example embodiments of the present disclosure are merely provided for description, and do not represent priorities of the example embodiments.

In the above example embodiments of the present disclosure, the description of each example embodiment has its emphasis. For parts not detailed in one example embodiment, please refer to the related description of other example embodiments.

In a few example embodiments provided by the present disclosure, it should be understood that the disclosed technological contents may by implemented in other manners. The example embodiments of the apparatus described above are merely illustrative. For example, the units are divided only by logical functions, and may be additionally divided in actual implementation. For example, a plurality of units or components may be combined or integrated into another system, or some features may be ignored or not executed. Besides, the revealed or mentioned mutual coupling or direct coupling or communication connection may be indirect coupling or communication connection through some interfaces, units, or modules, and may be electrical, or in other forms.

The units described as stand-alone units may be or not be physically separated, and the component shown as a unit may be or not be a physical unit, i.e., may be located in one place, or be distributed onto a plurality of network units. According to actual requirements, parts or all of the units therein may be selected to achieve the object of the solution of the present example embodiment.

In addition, the functional units in the example embodiments of the present disclosure may be integrated into one processing unit, or the units may separately physically exist, or two or more than two units may be integrated into one unit. The above integrated unit may be implemented in the form of hardware, or in the form of software.

The integrated unit, if implemented in the form of a software function unit and sold or used as a separate product, may be stored in a computer readable storage medium. Based on such understanding, the technical solution of the present disclosure may be essentially reflected or a part thereof making contribution to the prior art, or all or part of the technical solution may be reflected in the form of software products. The computer software products are stored in a storage medium, including a number of instructions for causing a computer device (which may be a personal computer, a server, a network device, or the like) to execute all or part of steps of the method according to the example embodiments of the present disclosure. The aforesaid storage medium includes various media that can store program codes, such as a U disk, a Read-Only Memory (ROM), a Random-Access Memory (RAM), a mobile hard disk, a magnetic disk, or an optical disk.

The above description merely provides preferred example embodiments. It should be noted that those of ordinary skills in the art may further make a number of improvements and modifications without departing from the principle of the present disclosure, and such improvements and modifications should also be regarded as falling within the scope of protection of the present disclosure.

The present disclosure may further be understood with clauses as follows.

Clause 1. A method for measurement processing of a cryptographic operation, the method comprising:
receiving, by a security chip, a cryptographic operation request;
acquiring, by the security chip, a measurement result, wherein the measurement result is a result of measuring a dynamic measurement module in a cryptographic operation module by using a platform measurement root; and
starting, by the security chip, a cryptographic operation in response to determining that the measurement result is identical to a pre-stored standard value.

Clause 2. The method according to clause 1, wherein the acquiring the measurement result comprises:
loading, by the security chip, the platform measurement root and the dynamic measurement module to a host processor; and
receiving, by the security chip, the measurement result of measuring the dynamic measurement module by the host processor using the platform measurement root.

Clause 3. The method according to clause 2, wherein:
the loading, by the security chip, the platform measurement root and the dynamic measurement module to the host processor comprises:
encrypting, by the security chip, the platform measurement root and the dynamic measurement module by using a private key of a measurement root secret key to obtain encrypted data; and
loading, by the security chip, the encrypted data to the host processor; and
the receiving, by the security chip, the measurement result of measuring the dynamic measurement module by the host processor using the platform measurement root comprises:
receiving, by the security chip, an encrypted measurement result of encrypting the measurement result by the host processor using a public key of the measurement root secret key, wherein the host processor, after receiving the encrypted data, decrypts the encrypted data using the public key of the measurement root secret key to obtain the platform measurement root and the dynamic measurement module, and measures the dynamic measurement module using a decrypted platform measurement root to obtain the measurement result.

Clause 4. The method according to clause 3, wherein the loading, by the security chip, the encrypted data to the host processor comprises:
loading, by the security chip, the encrypted data to a system memory for the host processor to read the encrypted data from the system memory.

Clause 5. The method according to clause 1, wherein the acquiring, by the security chip, the measurement result comprises:
measuring, by the security chip, the dynamic measurement module in the cryptographic operation module by using the platform measurement root to obtain the measurement result.

Clause 6. The method according to clause 1, wherein after receiving, by the security chip, the cryptographic operation request, the method further comprises:
authenticating the cryptographic operation request; and
after the authenticating is successful, entering the step of acquiring the measurement result of measuring the dynamic measurement module in the cryptographic operation module by using the platform measurement root.

Clause 7. The method according to clause 1, wherein the receiving, by the security chip, the cryptographic operation request at least comprises one of the following conditions:
receiving, by the security chip, the cryptographic operation request via a trusted software base; and
receiving, by the security chip, the cryptographic operation request via a trusted software stack.

Clause 8. The method according to any one of clauses 1 to 7, wherein before starting, by the security chip, the cryptographic operation in response to determining that the measurement result is identical to the pre-stored standard value, the method further comprises:
triggering, by the security chip, a trusted module of a system platform and the dynamic measurement module to preset a secret key for cryptographic operation measurement, wherein the secret key for cryptographic operation measurement is used for the cryptographic operation.

Clause 9. A method for dynamic measurement of a cryptographic operation, the method comprising:
receiving, by a host processor, a platform measurement root and a dynamic measurement module configured to start a cryptographic operation that are loaded by a security chip;
measuring, by the host processor, the dynamic measurement module by using the platform measurement root to obtain a measurement result; and
sending, by the host processor, the measurement result to the security chip such that the security chip determines whether to start a cryptographic operation based on a comparison result between the measurement result and a pre-stored standard value.

Clause 10. The method according to clause 9, wherein:
the receiving, by the host processor, the platform measurement root and the dynamic measurement module configured to start the cryptographic operation that are loaded by a security chip comprises: receiving, by the host processor, encrypted data obtained after encrypting the platform measurement root and the dynamic measurement module by the security chip using a private key of a measurement root secret key;
before the measuring, by the host processor, the dynamic measurement module by using the platform measurement root to obtain the measurement result, the method further comprises: decrypting, by the host processor, the encrypted data using a public key of the measurement root secret key to obtain the platform measurement root and the dynamic measurement module; and
the sending, by the host processor, the measurement result to the security chip comprises: encrypting, by the host processor, the measurement result using the public key of the measurement root secret key to obtain an encrypted measurement result; and sending the encrypted measurement result to the security chip.

Clause 11. An apparatus for dynamic measurement of a cryptographic operation, the apparatus being applied to a security chip and comprising:
a first receiving module configured to receive a cryptographic operation request;
an acquiring module configured to acquire a measurement result, wherein the measurement result is a result of measuring a dynamic measurement module in a cryptographic operation module by using a platform measurement root; and
a starting module configured to start a cryptographic operation in response to determining that the measurement result is identical to a pre-stored standard value.

Clause 12. An apparatus for dynamic measurement of a cryptographic operation, the apparatus being applied to a host processor and comprising:
a second receiving module configured to receive a platform measurement root loaded by a security chip and a dynamic measurement module configured to start a cryptographic operation;
a measuring module configured to measure the dynamic measurement module by using the platform measurement root to obtain a measurement result; and
a sending module configured to send the measurement result to the security chip, such that the security chip determines whether to start a cryptographic operation based on a comparison result between the measurement result and a pre-stored standard value.

Clause 13. A system for dynamic measurement of a cryptographic operation, comprising a security chip and a host processor, wherein
the security chip is configured to receive a cryptographic operation request; and load, in response to the cryptographic operation request, a platform measurement root and a dynamic measurement module configured to start a cryptographic operation in a cryptographic operation module to the host processor;
the host processor is configured to measure the dynamic measurement module by using the platform measurement root to obtain a measurement result, and send the measurement result to the security chip; and
the security chip is further configured to determine whether to start a cryptographic operation based on a comparison result between the measurement result and a pre-stored standard value.

Clause 14. The system according to clause 13, wherein:
the security chip is configured to encrypt the platform measurement root and the dynamic measurement module by using a private key of a measurement root secret key to obtain encrypted data, and load the encrypted data to the host processor;
the host processor is configured to decrypt the encrypted data by using a public key of the measurement root secret key to obtain the platform measurement root and the dynamic measurement module;
the host processor is configured to encrypt the measurement result by using the public key of the measurement root secret key to obtain an encrypted measurement result, and send the encrypted measurement result to the security chip; and
the security chip is configured to decrypt the encrypted measurement result by using the private key of the measurement root secret key to obtain the measurement result, and determine whether to start a cryptographic operation based on the measurement result obtained by decryption.

Clause 15. A storage medium comprising a stored program, wherein the program, when executed, controls a device where the storage medium is located to execute the method for dynamic measurement of a cryptographic operation according to any one of clauses 1 to 10.

Clause 16. A processor configured to run a program, wherein the program, when executed, executes the method for dynamic measurement a cryptographic operation according to any one of clauses 1 to 10.

Clause 17. A method for data processing, the method comprising:
receiving, by a first processor, a cryptographic operation request;
sending, by the first processor, a measurement root and a to-be-measured object to a second processor, wherein the second processor measures the to-be-measured object by using the measurement root;
receiving, by the first processor, a measurement result from the second processor; and
determining, by the first processor, that the measurement result meets a preset condition, and starting a cryptographic operation.

Clause 18. The method according to clause 17, wherein the measurement root is used as a trusted value for integrity measurement, and the measurement root comprises a platform measurement root based on a trusted platform.

Clause 19. The method according to clause 17, wherein the measuring the to-be-measured object by using the measurement root comprises:
calculating the to-be-measured object by using the measurement root to obtain a hash value of the to-be-measured object;
comparing the hash value with a preset hash value to obtain a comparison result; and
determining whether the integrity of the to-be-measured object has been destroyed based on the comparison result.

Clause 20. The method according to any one of clauses 17 to 19, wherein:
the first processor comprises a security chip; and
the second processor comprises a host processor of a system.

What is claimed is:
1. A method comprising:
receiving, by a security chip, a cryptographic operation request;
acquiring, by the security chip, a measurement result, wherein the measurement result is a result of measuring a dynamic measurement module in a cryptographic operation module by using a platform measurement root, and measuring the dynamic measurement module comprises:

calculating the dynamic measurement module by using the platform measurement root to obtain a hash value of the dynamic measurement module;

comparing the hash value with a preset hash value to obtain a comparison result; and determining whether an integrity of the dynamic measurement module has been destroyed based on the comparison result; and starting, by the security chip, a cryptographic operation in response to determining that the measurement result is identical to a pre-stored standard value.

2. The method of claim 1, wherein the acquiring the measurement result comprises:

loading, by the security chip, the platform measurement root and the dynamic measurement module to a host processor; and receiving, by the security chip, the measurement result of measuring the dynamic measurement module by the host processor using the platform measurement root.

3. The method of claim 2, wherein the loading, by the security chip, the platform measurement root and the dynamic measurement module to the host processor comprises:

encrypting, by the security chip, the platform measurement root and the dynamic measurement module by using a private key of a measurement root secret key to obtain encrypted data; and loading, by the security chip, the encrypted data to the host processor.

4. The method of claim 3, wherein the receiving, by the security chip, the measurement result of measuring the dynamic measurement module by the host processor using the platform measurement root comprises:

receiving, by the security chip, an encrypted measurement result of encrypting the measurement result by the host processor using a public key of the measurement root secret key.

5. The method of claim 4, wherein the host processor, after receiving the encrypted data, decrypts the encrypted data using the public key of the measurement root secret key to obtain the platform measurement root and the dynamic measurement module, and measures the dynamic measurement module using a decrypted platform measurement root to obtain the measurement result.

6. The method according to claim 3, wherein the loading, by the security chip, the encrypted data to the host processor comprises:

loading, by the security chip, the encrypted data to a system memory for the host processor to read the encrypted data from the system memory.

7. The method of claim 1, wherein the acquiring, by security chip, the measurement result comprises:

measuring, by the security chip, the dynamic measurement module in the cryptographic operation module by using the platform measurement root to obtain the measurement result.

8. The method of claim 1, wherein after receiving, by the security chip, the cryptographic operation request, the method further comprises:

authenticating the cryptographic operation request.

9. The method of claim 8, wherein the acquiring the measurement result comprises:

determining that the authenticating is successful; and acquiring the measurement result of measuring the dynamic measurement module in the cryptographic operation module by using the platform measurement root.

10. The method of claim 1, wherein the receiving, by the security chip, the cryptographic operation request at least comprises one of the following conditions:

receiving, by the security chip, the cryptographic operation request via a trusted software base; and receiving, by the security chip, the cryptographic operation request via a trusted software stack.

11. The method of claim 1, wherein before the starting, by the security chip, the cryptographic operation in response to determining that the measurement result is identical to the pre-stored standard value, the method further comprises:

triggering, by the security chip, a trusted module of a system platform and the dynamic measurement module to preset a secret key for cryptographic operation measurement, wherein the secret key for cryptographic operation measurement is used for the cryptographic operation.

12. An apparatus comprising:

one or more processors; and one or more memories storing computer readable instructions that, executable by the one or more processors, cause the one or more processors to perform acts comprising:

receiving, by a host processor, a platform measurement root and a dynamic measurement module that are loaded by a security chip;

measuring, by the host processor, the dynamic measurement module by using the platform measurement root to obtain a measurement result, wherein measuring the dynamic measurement module by using the platform measurement root comprises:

calculating the dynamic measurement module by using the platform measurement root to obtain a hash value of the dynamic measurement module;

comparing the hash value with a preset hash value to obtain a comparison result; and determining whether an integrity of the dynamic measurement module has been destroyed based on the comparison result; and sending, by the host processor, the measurement result to the security chip to enable the security chip to determine whether to start a cryptographic operation based on whether the measurement result is identical to a pre-stored standard value.

13. The apparatus of claim 12, wherein:

the receiving, by the host processor, the platform measurement root and the dynamic measurement module that are loaded by a security chip comprises:

receiving, by the host processor, encrypted data obtained after encrypting the platform measurement root and the dynamic measurement module by the security chip using a private key of a measurement root secret key.

14. The apparatus of claim 13, wherein before the measuring, by the host processor, the dynamic measurement module by using the platform measurement root to obtain the measurement result, the acts further comprise:

decrypting, by the host processor, the encrypted data using a public key of the measurement root secret key to obtain the platform measurement root and the dynamic measurement module.

15. The apparatus of claim 14, wherein the sending, by the host processor, the measurement result to the security chip comprises:

encrypting, by the host processor, the measurement result using the public key of the measurement root secret key to obtain an encrypted measurement result; and sending the encrypted measurement result to the security chip.

16. One or more memories storing computer readable instructions that, executable by one or more processors a first processor, cause the one or more processors first processor to perform acts comprising:

receiving a cryptographic operation request;

obtaining a measurement root and a to-be-measured object;

measuring the to-be-measured object using the measurement root to obtain a measurement result, the measuring including:

calculating the to-be-measured object by using the measurement root to obtain a hash value of the to-be-measured object;

comparing the hash value with a preset hash value to obtain a comparison result; and determining whether an integrity of the to-be-measured object has been destroyed based on the comparison result;

determining that the measurement result meets a is identical to-pre-stored standard value; and starting a cryptographic operation.

17. The one or more memories of claim 16, wherein the measurement root is used as a trusted value for integrity measurement.

18. The one or more memories of claim 16, wherein the measurement root comprises a platform measurement root based on a trusted platform.

19. The one or more memories of claim 16, wherein:

the first processor comprises a security chip.

* * * * *